(12) United States Patent
Matsunobu et al.

(10) Patent No.: US 9,143,805 B2
(45) Date of Patent: Sep. 22, 2015

(54) METHOD OF IMAGE CODING CHROMINANCE SIGNAL AND METHOD OF IMAGE DECODING CHROMINANCE SIGNAL

(75) Inventors: Toru Matsunobu, Osaka (JP); Takahiro Nishi, Nara (JP); Youji Shibahara, Osaka (JP); Hisao Sasai, Osaka (JP); Kyoko Tanikawa, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 480 days.

(21) Appl. No.: 13/546,086

(22) Filed: Jul. 11, 2012

(65) Prior Publication Data

US 2013/0016772 A1 Jan. 17, 2013

Related U.S. Application Data

(60) Provisional application No. 61/507,792, filed on Jul. 14, 2011.

(51) Int. Cl.
| | | |
|---|---|---|
| *H04N 19/86* | (2014.01) | |
| *H04N 19/176* | (2014.01) | |
| *H04N 19/70* | (2014.01) | |
| *H04N 19/126* | (2014.01) | |
| *H04N 19/14* | (2014.01) | |
| *H04N 19/154* | (2014.01) | |
| *H04N 19/593* | (2014.01) | |
| *H04N 19/186* | (2014.01) | |
| *H04N 19/36* | (2014.01) | |

(52) U.S. Cl.
CPC .............. *H04N 19/86* (2014.11); *H04N 19/126* (2014.11); *H04N 19/14* (2014.11); *H04N 19/154* (2014.11); *H04N 19/176* (2014.11); *H04N 19/70* (2014.11); *H04N 19/186* (2014.11); *H04N 19/36* (2014.11); *H04N 19/593* (2014.11)

(58) Field of Classification Search
None
See application file for complete search history.

(56) References Cited

PUBLICATIONS

Wiegand et al., "Overview of the H.264/AVC Video Coding Standard," IEEE Transactions on Circuits and Systems for Video Technology, Jul. 2003, pp. 1-19.*
Hur et al., "Adaptive Local Illumination Change Compensation Method for H.264/AVC-Based Multiview Video Coding," IEEE Transactions on Circuits and Systems for Video Technology, vol. 17, No. 11, Nov. 2007, pp. 1496-1505.*
ISO/IEC 14496-10, "MPEG-4 Part 10: Advanced Video Coding", Oct. 1, 2004.

(Continued)

*Primary Examiner* — Thai Tran
*Assistant Examiner* — Christopher T Braniff
(74) *Attorney, Agent, or Firm* — Wenderoth, Lind & Ponack, L.L.P.

(57) ABSTRACT

An image coding method includes: generating a temporarily coded chrominance signal from the coded residual signal and the intra prediction chrominance signal; calculating a direct-current component of the input chrominance signal; calculating a direct-current component of the temporarily coded chrominance signal; calculating an offset value from the direct-current component of the input chrominance signal and the direct-current component of the temporarily coded chrominance signal; coding quantized coefficients, an intra prediction mode, and the offset value; and adding the offset value to the temporarily coded chrominance signal to generate a coded chrominance signal.

12 Claims, 47 Drawing Sheets

(56) References Cited

PUBLICATIONS

Thomas Wiegand et al., "Overview of the H.264/AVC Video Coding Standard", IEEE Transactions on Circuits and Systems for Video Technology, vol. 13, No. 7, Jul. 2003, pp. 560-576.

Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603, ver.7, 5th Meeting: Geneva, CH, Mar. 16-23, 2011, http://phenix.int-evry.fr/jct/doc_end_user/documents/5_Geneva/wg11/JCTVC-E603-v7.zip.

\* cited by examiner

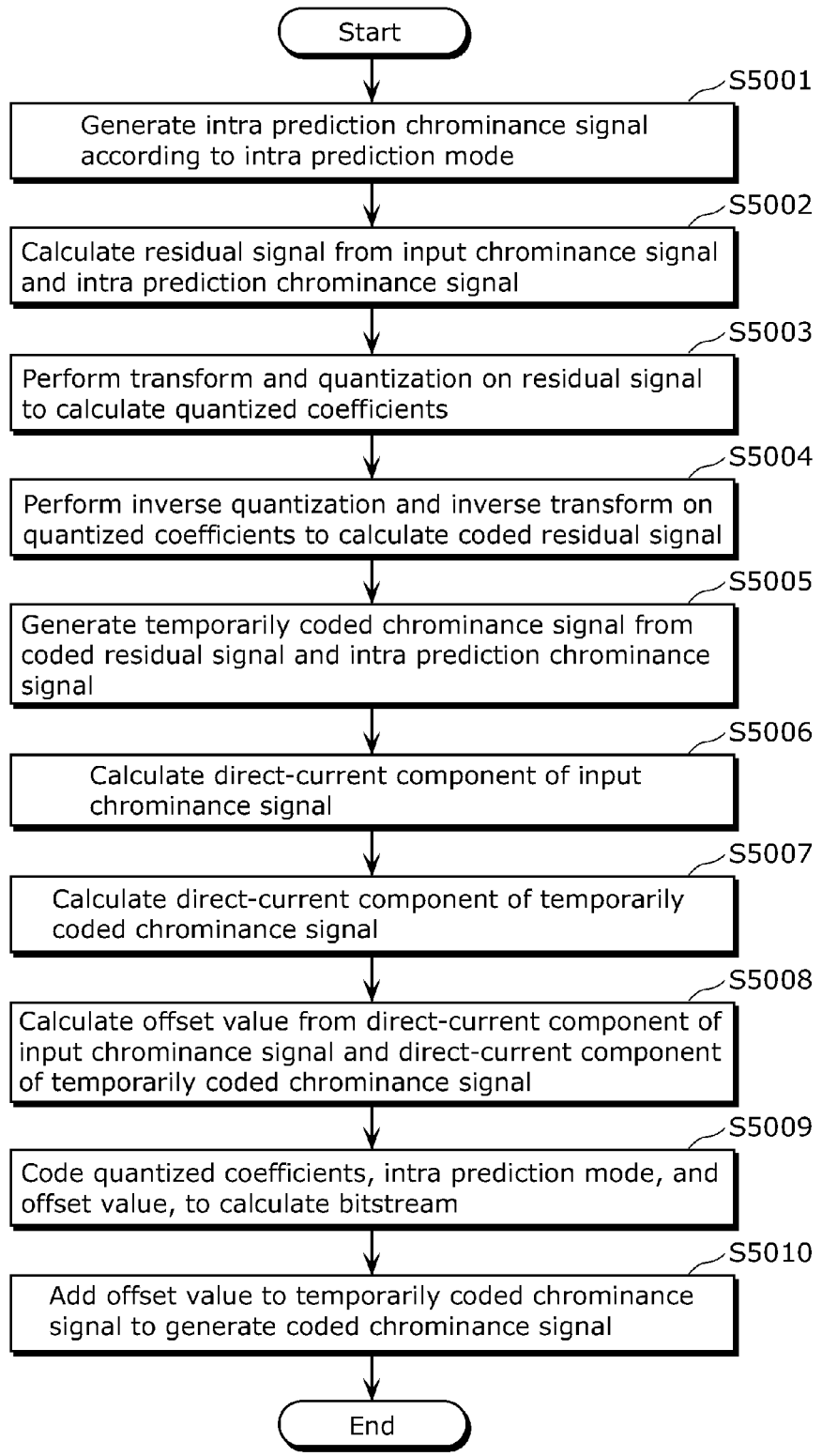

Result of calculating offset values for all blocks in area A

Offset values actually added in area A

Result of calculating offset values for all blocks in area A

Offset value actually added in area A

FIG. 21

| prediction_unit( x0, y0,log2PUWidth, log2PUHeight, PartIdx , InferredMergeFlag){ | Descriptor |
|---|---|
| if(skip_flag[x0][y0]){ | |
|   if( NumMergeCand > 1) | |
|     merge_idx[x0][y0] | ue(v)| ae(v) |
| } else if( PredMode == MODE_INTRA ){ | |
|   prev_intra_luma_pred_flag[x0][y0] | u(l)|ae(v) |
|   if( prev_intra_luma_pred_flag[x0][y0]) | |
|     if( NumMBMCand > 1) | |
|       mpm_idx[x0][y0] | u(l)|ae(v) |
|   else | |
|     rem_intra_luma_pred_mode[x0][y0] | ce(v)| ae(v) |
|   intra_chroma_pred_mode[x0][y0] | ue(v)| ae(v) |
|   intra_chroma_oft[0] | |
|   intra_chroma_oft[1] | |
| } else { /* MODE_INTER */ | |
|   if(!InferredMergeFlag) | |
|     if( entropy_coding_mode_flag?  PartMode != PART_2Nx2N) | |
|       merge_flag[x0][y0] | u(l)|ae(v) |
|   if( merge_flag[x0][y0] && NumMergeCand  > 1){ | |
|     merge_idx(x0][y0] | ue(v)| ae(v) |
|   } else { | |
|     if( slice_type == B ) | |
|       inter_pred_flag[x0][y0] | ue(v)| ae(v) |
|     if(inter_pred_flag[x0][y0] == Pred_LC ){ | |
|       if( num_ref_idx_lc_active_minus1 > 0 ) | |
|         ref_idx_lc[x0](y0) | ue(v)| ae(v) |
|       mvd_lc[x0][y0][0] | se(v)| ae(v) |
|       mvd_lc[x0][y0][1] | se(v)| ae(v) |
|       if(NumMVPCand(LcToLx ) > 1) | |
|         mvp_idx_lc[x0][y0] | ue(v)| ae(v) |
|     } | |
|     else {/* Pred_L0 or Pred_BI */ | |
|       if( num_ref_idx_l0_active_minus1 > 0 ) | |
|         ref_idx_l0[x0][y0] | ue(v)| ae(v) |
|       mvd_l0|x0][y0][0] | se(v)| ae(v) |
|       mvd_l0|x0][y0][1] | se(v)| ae(v) |
|       if(NumMVPCand(L0) > 1) | |
|         mvp_idx_l0[x0][y0] | ue(v)| ae(v) |
|     } | |
|     if(inter_pred_flag[x0][y0] == Pred_BI ){ | |
|       if( num_ref_idx_l1_active_minus1 > 0 ) | |
|         ref_idx_l1[x0][y0] | ue(v)| ae(v) |
|       mvd_l1[x0][y0][0] | se(v)| ae(v) |
|       mvd_l1[x0][y0][1] | se(v)| ae(v) |
|       if(NumMVPCand(L1) > 1) | |
|         mvp_idx_l1[x0][y0] | ue(v)| ae(v) |
|     } | |
|   } | |
| } | |
| } | |

Offset value for U → intra_chroma_oft[0]
Offset value for V → intra_chroma_oft[1]

FIG. 22

| slice_data( ){ | Descriptor |
|---|---|
|   CurrTbAddr=first_tb_in_slice | |
|   moreDataFlag=1 | |
|   if( adaptive_loop_filter_flag && alf_cu_control_flag ) | |
|     AlfCuFlagIdx=-1 | |
|   do { | |
|     xCU=HorLumaLocation( CurrTbAddr ) | |
|     yCU=HorLumaLocation( CurrTbAddr ) | |
|     if(Slice_type==1){ | |
|       intra_Chroma_oft[0] | |
|       intra_Chroma_oft[1] | |
|     } | |
|     coding_tree( xCu,yCU,Log2TbSize) | |
|     if( !entropy_coding_mode_flag ) | |
|       moreDataFlag=more_rbsp_data( ) | |
|     else { | |
|       end_of_slice_flag | ae(v) |
|       moreDataFlag=!end_of_slice_flag | |
|     } | |
|     CurrTbAddr=NextTbAddress( CurrTbAddr ) | |
|   } while( moreDataFlag ) | |
| } | |

Offset value for U → intra_Chroma_oft[0]

Offset value for V → intra_Chroma_oft[1]

FIG. 23

| Block size | Quantized parameter | Quantization step | Signal level representable in spatial domain |
|---|---|---|---|
| 4×4 | 22 | 256 | 2 |
| 4×4 | 16 | 128 | 1 |
| 8×8 | 34 | 512 | 4 |
| 8×8 | 22 | 128 | 1 |
| 16×16 | 34 | 256 | 2 |
| 16×16 | 28 | 128 | 1 |
| 32×32 | 40 | 256 | 2 |
| 32×32 | 34 | 128 | 1 |
| 32×32 | 28 | 64 | 1 |

FIG. 35

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 38
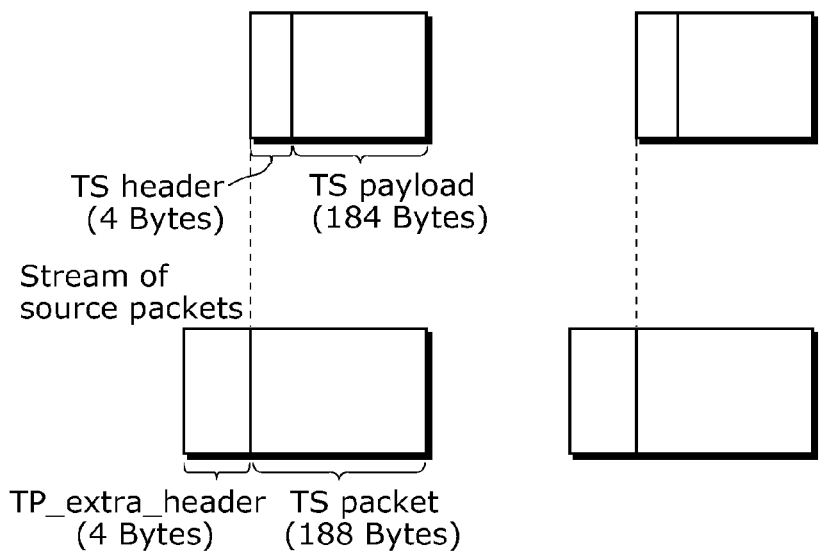
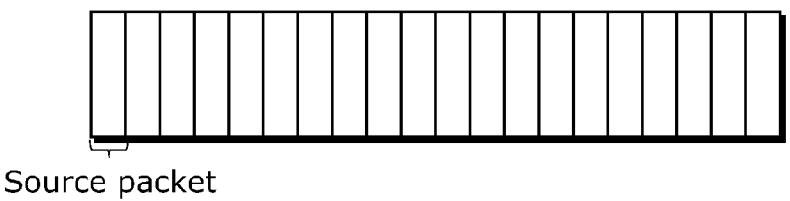

FIG. 46

| Corresponding standard | Driving frequency |
|---|---|
| MPEG-4 AVC | 500 MHz |
| MPEG-2 | 350 MHz |
| ⋮ | ⋮ |

METHOD OF IMAGE CODING CHROMINANCE SIGNAL AND METHOD OF IMAGE DECODING CHROMINANCE SIGNAL

CROSS REFERENCE TO RELATED APPLICATION

The present application claims the benefit of U.S. Provisional Patent Application No. 61/507,792 filed on Jul. 14, 2011. The entire disclosures of the above-identified application, including the specification, drawings and claims are incorporated herein by reference in their entirety.

FIELD

The present disclosure relates to image coding methods, image decoding methods, image coding apparatuses, and image decoding apparatuses, and particularly to an image coding method, an image decoding method, an image coding apparatus, and an image decoding apparatus for calculating chrominance signals using intra prediction.

BACKGROUND

Recent years have seen an increase in the number of applications for services of, for example, video on demand type services. Examples of such services include video-conferencing through the Internet, digital video broadcasting, and streaming of video contents. These applications depend on transmission of video information. These applications require that such video data having a substantial amount of digital data is transmitted through conventional transmission channels each having a limited bandwidth or recorded on conventional recording media each having a limited data capacity. Accordingly, in order to transmit the video data using a conventional transmission channel and to record the video data onto a conventional recording medium, it is inevitable to compress or reduce the amount of the video data.

For the purpose of compressing video data, many video coding standards have been developed. For the purpose of compressing video data, many video coding standards have been developed. Such video coding standards are, for instance, International Telecommunication Union Telecommunication Standardization Sector (ITU-T) standards denoted as H.26x and ISO/IEC standards denoted as MPEG-x. The most advanced video coding standards are currently the standards denoted as H.264/AVC or MPEG-4/AVC (see Non-patent Literature 1 and Non-patent Literature 2).

In addition, in the High Efficiency Video Coding (HEVC) that is the next-generation image coding standard, various considerations for increasing coding efficiency have been made (see Non-patent Literature 3).

CITATION LIST

Non Patent Literature

[NPL 1]
ISO/IEC 14496-10 "MPEG-4 Part10 Advanced Video Coding"

[NPL 2]
Thomas Wiegand et al, "Overview of the H.264/AVC Video Coding Standard", IEEE TRANSACTIONS ON CIRCUITS AND SYSTEMS FOR VIDEO TECHNOLOGY, JULY 2003, PP. 1-1

[NPL 3]
Joint Collaborative Team on Video Coding (JCT-VC) of ITU-T SG16 WP3 and ISO/IEC JTC1/SC29/WG11 5th Meeting: Geneva, CH, 6-23 Mar. 2011 JCTVC-E603 Title: WD3: Working Draft 3 of High-Efficiency Video Coding ver.7 http://phenix.int-evry.fr/jct/doc_end_user/documents/5_Geneva/wg11/JCTVC-E603-v7.zip

SUMMARY

Technical Problem

However, the aforementioned technique has a problem of inevitably decreasing a subjective image quality.

The present disclosure provides an image coding method and an image decoding method for enhancing the image quality of coded images and decoded images.

An image coding method according to an aspect of the present disclosure is a method which is for coding chrominance signals and includes: generating an intra prediction chrominance signal according to an intra prediction mode; calculating a residual signal from the intra prediction chrominance signal and an input chrominance signal; performing transform and quantization on the residual signal to calculate quantized coefficients; performing inverse quantization and inverse transform on the quantized coefficients to calculate a coded residual signal; generating a temporarily coded chrominance signal, from the coded residual signal and the intra prediction chrominance signal; calculating a direct-current component of the input chrominance signal; calculating a direct-current component of the temporarily coded chrominance signal; calculating an offset value from the direct-current component of the input chrominance signal and the direct-current component of the temporarily coded chrominance signal; coding the quantized coefficients, the intra prediction mode, and the offset value; and adding the offset value to the temporarily coded chrominance signal to generate the coded chrominance signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

According to the image coding method and the image decoding method disclosed herein, it is possible to reduce distortion in chrominance signals, and to thereby enhance the subjective image quality.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 5 is a flowchart of an exemplary chrominance signal intra prediction unit in the image coding according to Embodiment 1.

FIG. 21 is a diagram of an exemplary syntax of a prediction unit in a chrominance signal intra prediction in the image decoding according to Embodiment 4.

FIG. 22 is a diagram of an exemplary syntax of slice data in a chrominance signal intra prediction in the image decoding according to Embodiment 6.

FIG. 23 is an association table of block sizes, quantization parameters, quantization steps, and signal levels that can be represented in spatial domain according to Embodiment 7.

FIG. 35 illustrates a structure of multiplexed data.

FIG. 38 shows a structure of TS packets and source packets in the multiplexed data.

FIG. 46 shows an example of a look-up table in which video data standards are associated with driving frequencies.

DESCRIPTION DESCRIPTION (Underlying Knowledge Forming Basis of the Present Disclosure)

The inventors have arrived at the present disclosure based on the following underlying knowledge.

Figure 1:
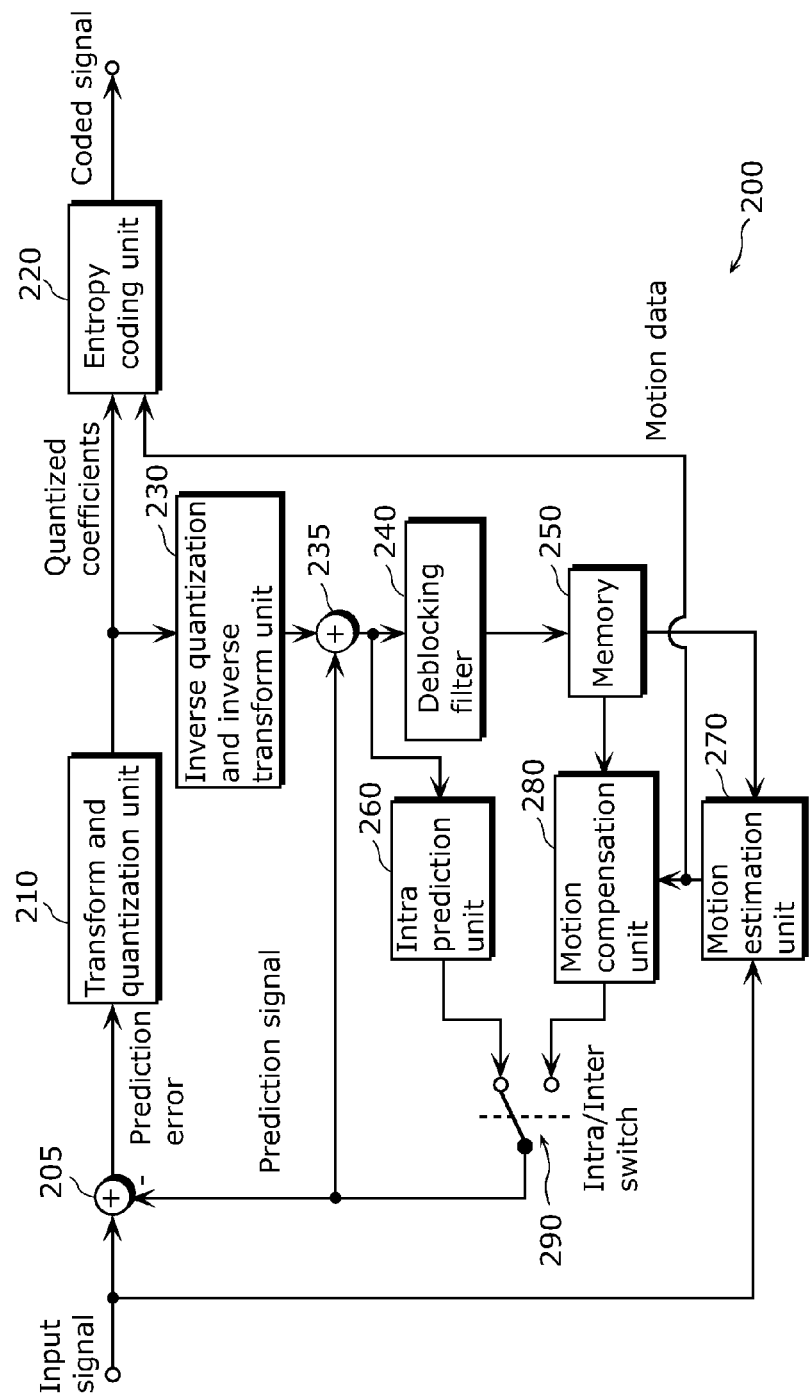
FIG. 1 is a block diagram of an exemplary structure of an image coding apparatus according to Embodiment 1.
Figure 12:
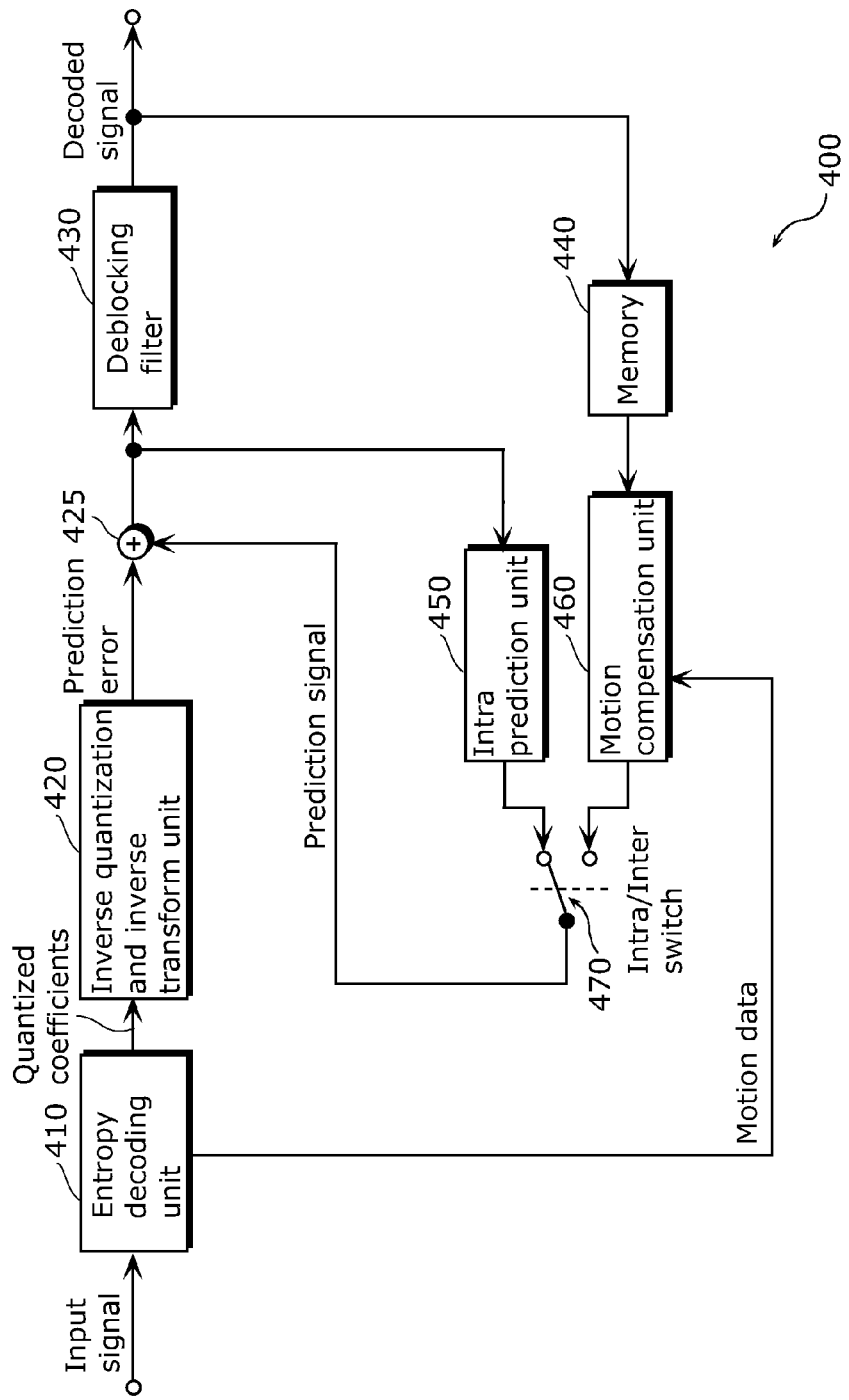
FIG. 12 is a block diagram of an exemplary structure of an image decoding apparatus according to Embodiment 4.

As shown in FIG. 1 and FIG. 12, each of a series of image coding processes and a series of image decoding processes in the HEVC standard is roughly divided into processes including prediction, transform, quantization, and entropy coding or entropy decoding. The prediction among these processes is further divided into inter-frame prediction and intra prediction. The intra prediction is to generate prediction pixels for a current macroblock to be processed by interpolation using adjacent pixels in an adjacent macroblock located above, left, or the like with respect to the current macroblock. In the HEVC intra prediction, prediction is performed at a pixel level rather than at a DCT coefficient level, and pixel prediction patterns in the vertical, horizontal, and diagonal directions are also utilized.

Conventional intra prediction for chrominance signals is described with reference to FIG. 2, FIG. 3, FIG. 13, and FIG. 14.

Figure 2:
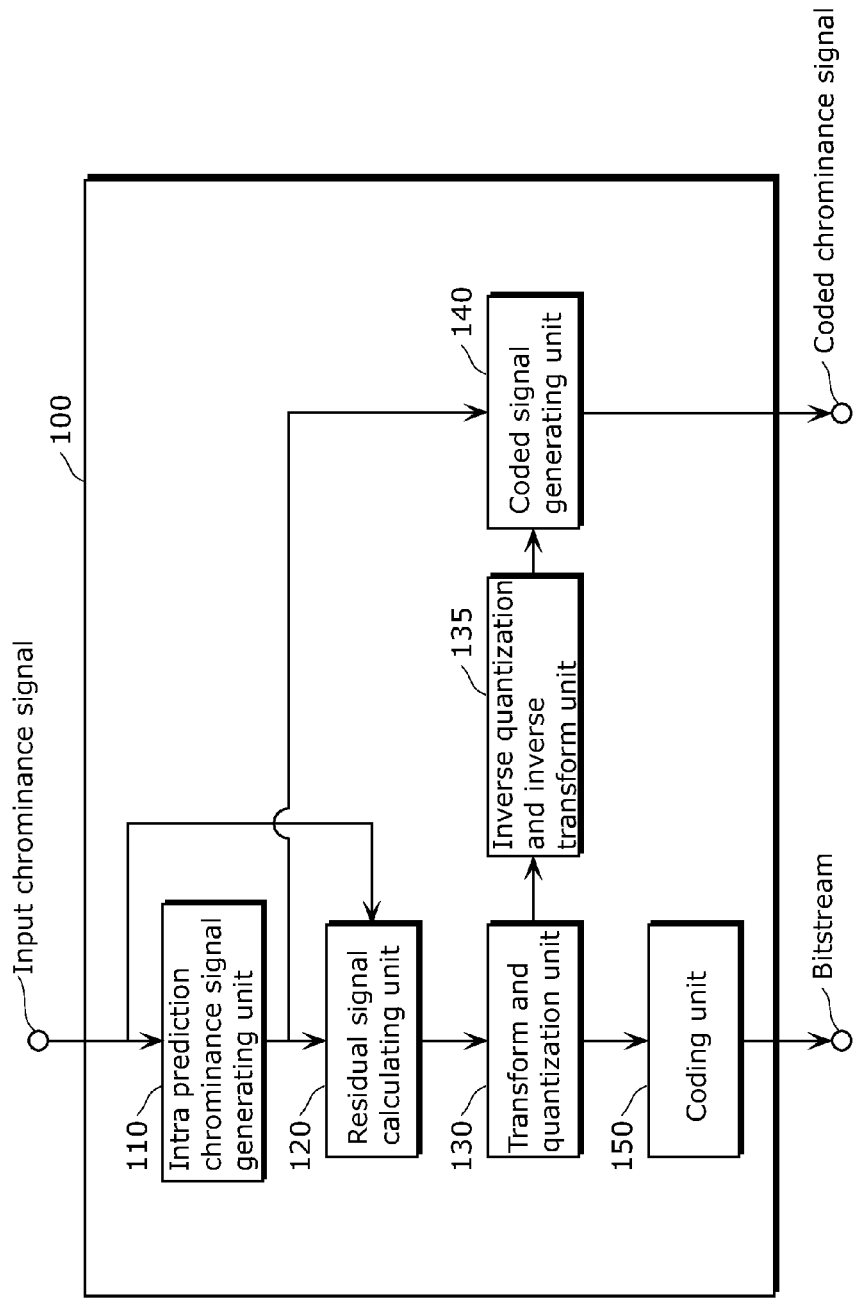
FIG. 2 is a block diagram of a chrominance signal intra prediction unit of a conventional image coding apparatus.

A description is given of a structure of a chrominance signal intra prediction unit 100 which performs intra prediction of chrominance signals according to a conventional image coding method. FIG. 2 is a block diagram of an example of the structure of the conventional chrominance signal intra prediction unit 100.

As shown in FIG. 2, the chrominance signal intra prediction unit 100 includes an intra prediction chrominance signal generating unit 110, a residual signal calculating unit 120, a transform and quantization unit 130, a coding unit 150, an inverse quantization and inverse transform unit 135, and a coded signal generating unit 140.

Figure 3:
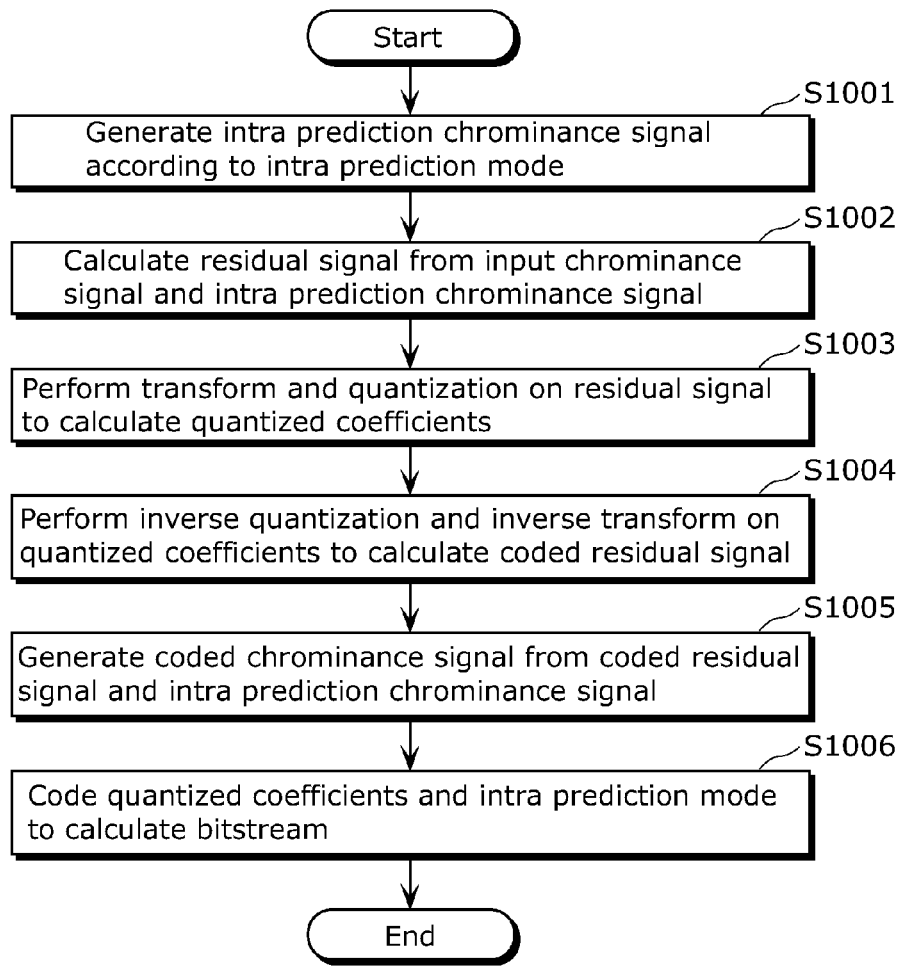
FIG. 3 is a flowchart of operations performed by the chrominance signal intra prediction unit of the conventional image coding apparatus.

Operations performed by the conventional chrominance signal intra prediction unit 100 are described in detail. FIG. 3 is a flowchart of processes performed by a chrominance signal intra prediction unit 100.

First, an intra prediction chrominance signal is generated according to an intra prediction mode (Step S1001). The intra prediction mode is an index number indicating a method of generating the intra prediction chrominance signal. The intra-prediction chrominance signal is generated by using, as necessary, a coded luminance signal of an adjacent block, a coded chrominance signal of an adjacent block, a coded luminance signal of a current block to be processed according to the intra prediction mode.

Next, a residual signal is calculated from an input chrominance signal and the intra prediction chrominance signal (Step S1002). A residual signal is obtained by calculating the difference between the input chrominance signal and the intra prediction chrominance signal.

Next, quantized coefficients are generated by performing transform and quantization on the residual signal (Step S1003). In the quantization, the value obtained by transforming the residual signal is approximated in a rougher segment. Here, the value indicating the roughness is referred to as a quantization parameter (hereinafter, also referred to as QP). As the QP is larger, such approximation is performed in a larger segment, resulting in a larger error from the original input chrominance signal.

Next, inverse quantization and inverse transform are performed on the quantized coefficients to calculate a coded residual signal (Step S1004). The inverse quantization and inverse transform are performed according to a procedure completely inverse to a procedure in Step S1003.

Next, a coded chrominance signal is generated from the coded residual signal and the coded intra prediction chrominance signal (Step S1005). The coded chrominance signal is calculated by adding the coded residual signal and the coded intra prediction chrominance signal.

Next, a bitstream is calculated by coding the quantized coefficients and the intra prediction mode (Step S1006). In the coding, the quantized coefficients are assigned with variable codes so as to shorten a bit length, with an aim to yield an increased compression efficiency. The bitstream generated by performing such efficient data compression is transmitted or recorded.

Figure 13:
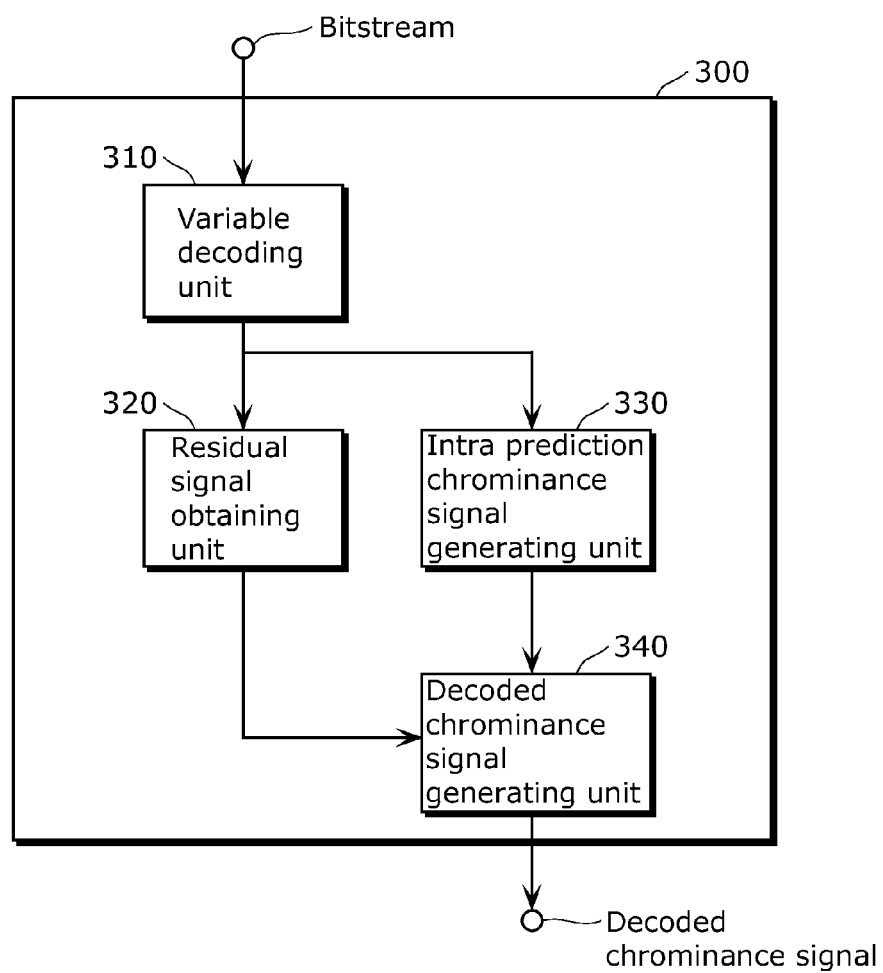
FIG. 13 is a block diagram of a chrominance signal intra prediction unit of a conventional image decoding apparatus.

A description is given of a structure of a chrominance signal intra prediction unit 300 which performs intra prediction of chrominance signals according to a conventional image decoding method. FIG. 13 is a block diagram of an example of the structure of the conventional chrominance signal intra prediction unit 300.

As shown in FIG. 13, the chrominance signal intra prediction unit 300 includes a variable length decoding unit 310, a residual signal obtaining unit 320, an intra prediction chrominance signal generating unit 330, and a decoded chrominance signal generating unit 340.

Operations performed by the conventional chrominance signal intra prediction unit 300 are described in detail with reference to FIG. 14.

Figure 14:
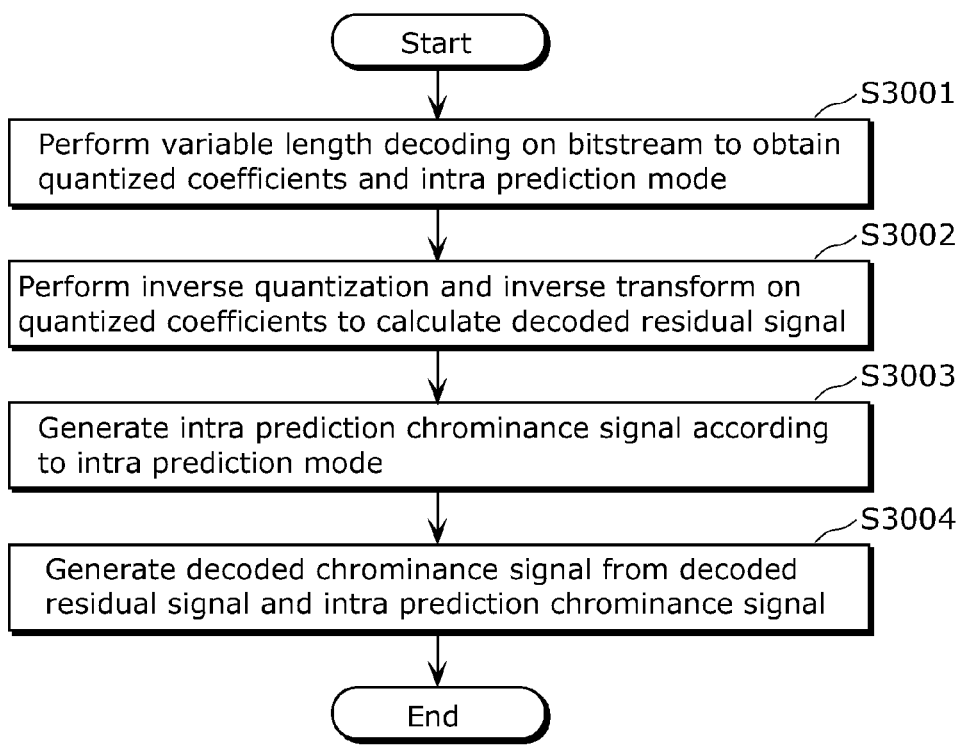
FIG. 14 is a flowchart of operations performed by the chrominance signal intra prediction unit of the conventional image decoding apparatus.

FIG. 14 is a flowchart of processes performed by a chrominance signal intra prediction unit 300.

First, a variable length decoding is performed on a bitstream, to obtain quantized coefficients and an intra prediction mode (Step S3001).

Next, inverse quantization and inverse transform are performed on the quantized coefficients to obtain a decoded residual signal (Step S3002). The decoded residual signal is already approximated in a rougher segment through the quantization in the coding. Thus, when the decoded residual signal is used to generate a decoded chrominance signal, an error from the original input signal is made.

Next, an intra prediction chrominance signal is generated according to the intra prediction mode (Step S3003). The intra prediction chrominance signal is generated by using, as necessary, a decoded luminance signal of an adjacent block, a decoded chrominance signal of the adjacent block, a decoded luminance signal of a current block to be processed according to the intra prediction mode.

Next, a decoded chrominance signal is generated from the decoded residual signal and the intra prediction chrominance signal (Step S3004). A decoded chrominance signal is calculated by adding the decoded residual signal and the intra prediction chrominance signal.

According to the aforementioned conventional technique, quantization is performed in the coding of a residual signal that is the difference between the input signal and the prediction signal. Thus, a larger QP results in a larger error between the input signal and the coded chrominance signal, or a larger error between an input image and the decoded chrominance signal. Particularly in the case of a chrominance signal, a slight difference in value is presented as a noticeable color distortion in a subjective image quality.

In order to solve the aforementioned problem, an image coding method according to an aspect of the present disclosure is a method which is for coding chrominance signals and includes: generating an intra prediction chrominance signal according to an intra prediction mode; calculating a residual signal from the intra prediction chrominance signal and an input chrominance signal; performing transform and quantization on the residual signal to calculate quantized coefficients; performing inverse quantization and inverse transform on the quantized coefficients to calculate a coded residual signal; generating a temporarily coded chrominance signal, from the coded residual signal and the intra prediction chrominance signal; calculating a direct-current component of the input chrominance signal; calculating a direct-current component of the temporarily coded chrominance signal; calculating an offset value from the direct-current component of the input chrominance signal and the direct-current component of the temporarily coded chrominance signal; coding the quantized coefficients, the intra prediction mode, and the offset value; and adding the offset value to the temporarily coded chrominance signal to generate the coded chrominance signal.

In this way, it is possible to reduce the error between the input chrominance signal and the coded chrominance signal.

For example, in the calculating of a direct-current component of an input chrominance signal, the direct-current component of the input chrominance signal may be one of an average value of pixel values of pixels in the input chrominance signal and a direct-current component obtained by performing frequency transform on the input chrominance signal.

In addition, in the calculating of a direct-current component of a temporarily coded chrominance signal, the direct-current component of the temporarily coded chrominance signal may be one of an average value of pixel values of pixels in the temporarily coded chrominance signal and a direct-current component obtained by performing frequency transform on the temporarily coded chrominance signal.

In addition, in the calculating of an offset value, the offset value may be calculated using a block size, a quantization parameter, and a quantization step.

In addition, the image coding method may further include determining whether an offset process needs to be performed on a current block to be processed, based on the input chrominance signal.

In addition, the image coding method may further include determining whether an offset process needs to be performed on a current block to be processed, based on the temporarily coded chrominance signal.

In addition, the image coding method may further include determining whether an offset process needs to be performed on a current block to be processed, using a block size, a quantization parameter, and a quantization step.

For example, an offset value may be set to 0 when, based on the input chrominance signal, it is determined in the determining that the offset process does not need to be performed on the current block to be processed.

On the other hand, when, based on the input chrominance signal, it is determined in the determining that the offset process does not need to be performed on the current block to be processed, the following processes may be skipped: the calculating of the direct-current component of the input chrominance signal, the calculating of the direct-current component of the temporarily coded chrominance signal, the calculating of the offset value, and the coding of the offset value.

In addition, the image coding method may further include collecting offset values calculated for all blocks in an arbitrary processing area, and determining an offset unit; and coding information about the offset unit.

In addition, the image coding method may further include performing an offset process on a coded luminance signal.

In order to solve the aforementioned problem, an image decoding method according to an aspect of the present disclosure is a method which is for decoding chrominance signals and includes: performing variable length decoding on a bitstream to obtain quantized coefficients, an intra prediction mode, and an offset value; performing inverse quantization and inverse transform on the quantized coefficients to obtain a decoded residual signal; generating an intra prediction chrominance signal according to the intra prediction mode of the chrominance signal; generating a temporarily decoded chrominance signal, from the decoded residual signal and the intra prediction chrominance signal; and generating a decoded chrominance signal by adding the offset value to the temporarily decoded chrominance signal.

In addition, the image coding method may further include determining whether or not an offset process needs to be performed; and performing variable length decoding on a bitstream only when the offset process needs to be performed, to obtain information about the offset unit; wherein, in the generating of a decoded chrominance signal, the offset value is added only when the offset process needs to be performed.

In addition, the image coding method may further include determining whether an offset process needs to be performed on a current block to be processed, based on the temporarily decoded chrominance signal.

In addition, the image coding method may further include determining whether an offset process needs to be performed on a current block to be processed, using a block size, a quantization parameter, and a quantization step.

In addition, the image coding method may further include performing variable length decoding on a bitstream to obtain the information about the offset unit, wherein, in the performing of variable length decoding, based on the information about the offset unit, the offset value is obtained by performing variable length decoding on the bitstream, when the offset value needs to be updated.

In addition, the image coding method may further include performing an offset process on a decoded luminance signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are described with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the Claims. Therefore, among the structural elements in the following exemplary embodiments, structural elements not recited in any one of the independent claims defining the most generic inventive concept are described as arbitrary structural elements.

Embodiment 1

Figure 4:
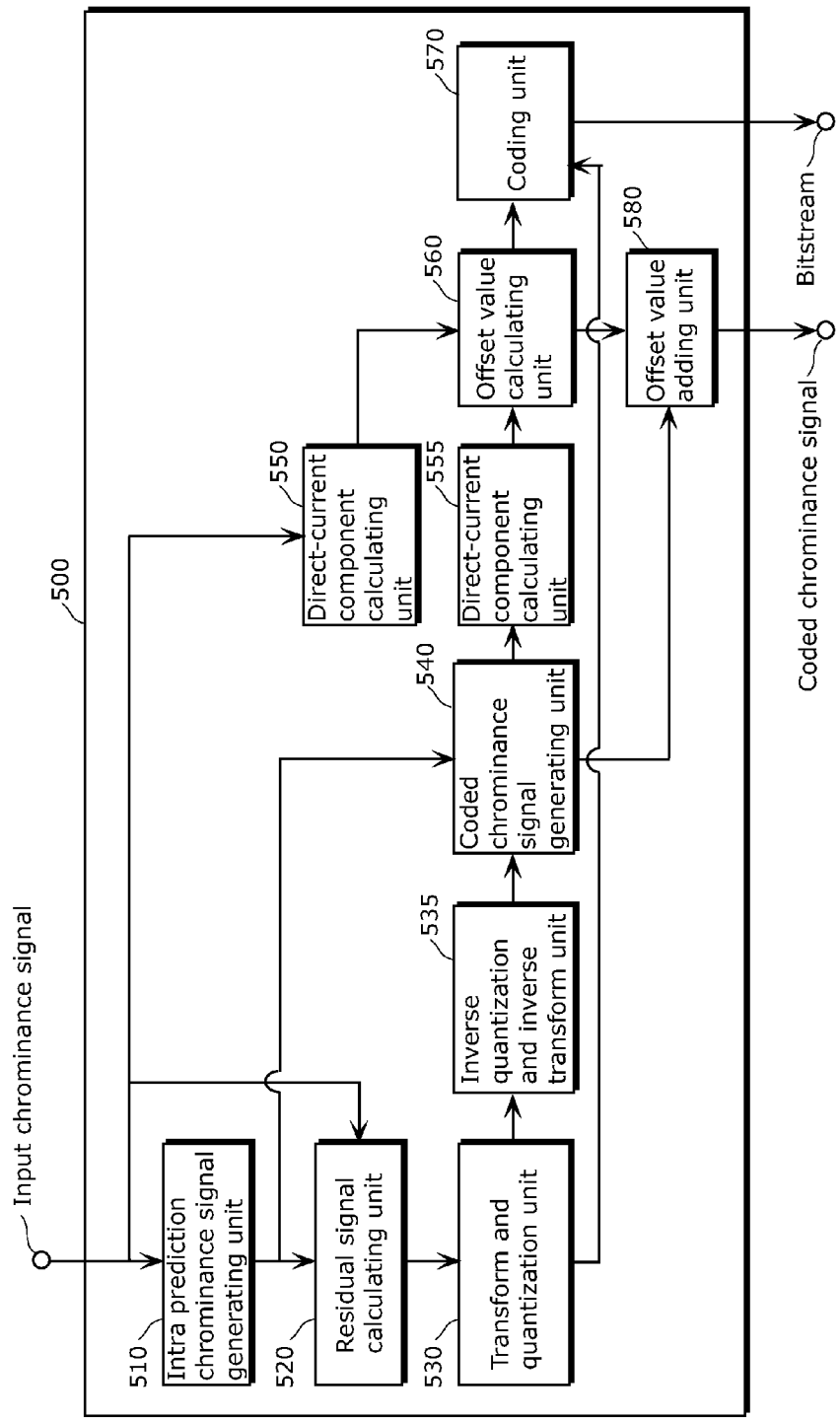
FIG. 4 is a block diagram of an exemplary chrominance signal intra prediction unit in image coding according to Embodiment 1.

A description is given of a structure of a chrominance signal intra prediction unit 500 which performs an intra prediction method in an offset process of a chrominance signal according to this embodiment. FIG. 4 is a block diagram of a structure of a chrominance signal intra prediction unit 500 according to Embodiment 1. As described later, the chrominance signal intra prediction unit 500 according to Embodiment 1 compression codes an image signal, and corresponds to a part of an image coding apparatus 200 which outputs coded image data.

As shown in FIG. 4, the chrominance signal intra prediction unit 500 includes an intra prediction chrominance signal generating unit 510, a residual signal calculating unit 520, a transform and quantization unit 530, an inverse quantization and inverse transform unit 535, a temporarily coded chrominance signal generating unit 540, a direct-current component calculating unit 550, a direct-current component calculating unit 555, an offset value calculating unit 560, a coding unit 570, and an offset value adding unit 580.

Operations performed by the conventional chrominance signal intra prediction unit 500 according to Embodiment 1 are described in detail with reference to FIG. 5.

FIG. 5 is a flowchart of processes performed by a chrominance signal intra prediction unit 500.

First, an intra prediction chrominance signal is generated according to an intra prediction mode (Step S5001). The intra prediction chrominance signal is generated by using, as necessary, a coded luminance signal of an adjacent block, a coded chrominance signal of the adjacent block, a coded luminance signal of a current block to be processed according to the intra prediction mode.

Next, a residual signal is calculated from an input chrominance signal and the intra prediction chrominance signal (Step S5002). A residual signal is obtained by calculating the difference between the input chrominance signal and the intra prediction chrominance signal.

Next, quantized coefficients are generated by performing transform and quantization on the residual signal (Step S5003). In the quantization, the value obtained by transforming the residual signal is approximated in a rougher segment. At this time, as the QP is larger, such approximation is performed in a larger segment, resulting in a larger error from the original input chrominance signal.

Next, inverse quantization and inverse transform are performed on the quantized coefficients to calculate a coded residual signal (Step S5004). The inverse quantization and inverse transform are performed according to a procedure completely inverse to a procedure in Step S5003.

Next, a temporarily coded chrominance signal is generated from the coded residual signal and the intra prediction chrominance signal (Step S5005). The temporarily coded chrominance signal is calculated by adding the coded residual signal and the intra prediction chrominance signal.

Next, a direct-current component of the input chrominance signal is calculated (Step S5006). Here, the direct-current component means an average value in a signal waveform. This direct-current component is obtained by calculating the average value of pixel values of pixels in the input chrominance signal. In addition, a DC component obtained by performing frequency transform on the input chrominance signal may be regarded as the direct-current component of the input chrominance signal.

Next, a direct-current component of the temporarily coded chrominance signal is calculated (Step S5007). Here, the direct-current component calculation method is performed in the same manner as the method in Step S5006.

Next, an offset value is calculated from the direct-current component of the input chrominance signal and the direct-current component of the temporarily coded chrominance signal (Step S5008).

Next, a bitstream is calculated by coding the quantized coefficients, the intra prediction mode, and the offset value (Step S5009).

Next, a coded chrominance signal is generated by adding the offset value to the temporarily coded chrominance signal (Step S5010).

The processes from Steps S5001 to S5010 are performed on all blocks repeatedly.

Here, the offset value is described. The offset value between the direct-current component of the input chrominance signal and the direct-current component of the temporarily coded chrominance signal is calculated according to Expression 1.

[Math. 1]

$$\text{tmp\_offset} = \text{average}(\text{Input}C) - \text{average}(\text{tmpRec}C) \quad \text{(Expression 1)}$$

Expression 1 is an example in which the direct-current component is the average of the pixel values of pixels in each chrominance signal. InputC denotes an input chrominance signal block, and tmpRecC denotes a temporarily coded chrominance signal. Average( ) is a function for calculating an average of signal values of signals in an input block. An offset value temp_offset calculated according to Expression 1 is at a sub-pixel accuracy. The use of this offset value temp_offset makes it possible to reconstruct a coded chrominance signal highly accurately, but causes increase in the bit amount of a coded bitstream. Thus, quantization and clipping processes are performed in order to reduce the information amount of the offset value as shown in Expression 2.

[Math. 2]

$$\text{offset} = \text{Clip}(\text{Disc}(\text{tmp\_offset})) \quad \text{(Expression 2)}$$

Figure 6A:
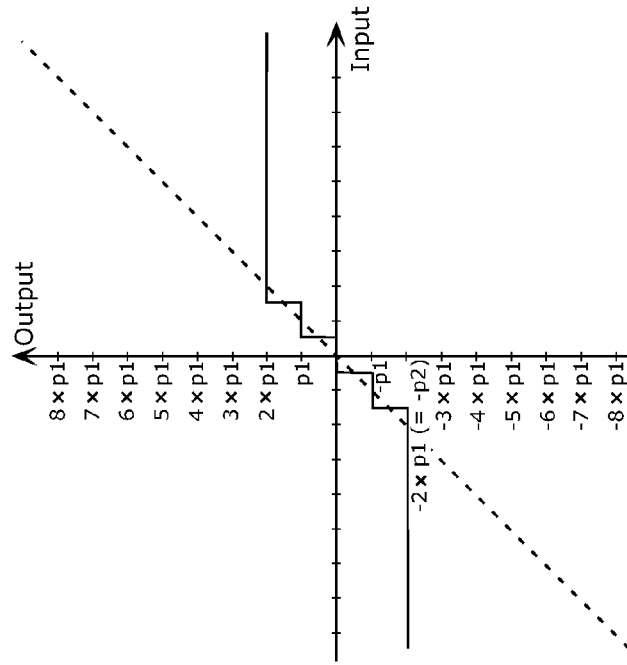
FIG. 6A is a schematic diagram of an exemplary chrominance signal intra prediction value calculation in the image coding according to Embodiment 1.
Figure 6B:
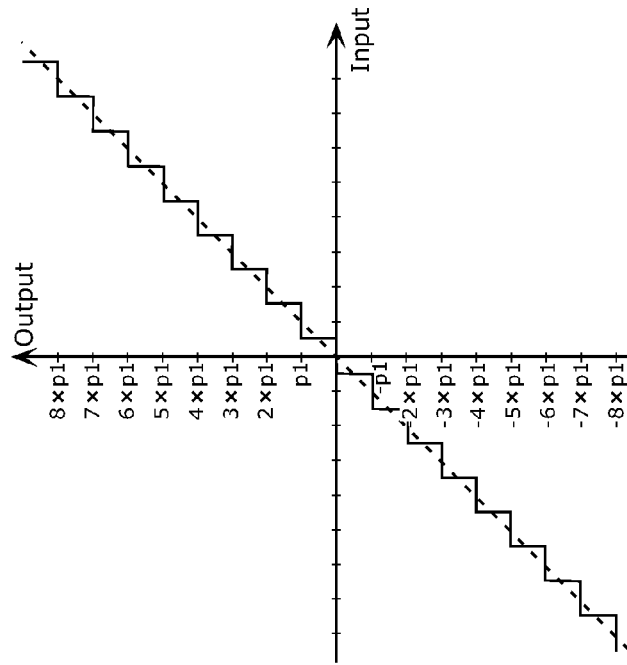
FIG. 6B is a schematic diagram of an exemplary chrominance signal intra prediction value calculation in the image coding according to Embodiment 1.

Here, offset is an output value from the offset value calculating unit 560, and is an offset value of an integer accuracy that is actually added to the temporarily coded chrominance signal. Disc( ) is a function for quantizing the offset value temp_offset of the integer accuracy into a value that is an integer multiple of a parameter p1. Clip( ) is a process of rounding a value outside a specified range to a maximum value or a minimum value in the specified range according to a parameter p2. Each of FIGS. 6A and 6B shows an example of the processes of quantizing and clipping an offset value.

Here, each of the parameters p1 and p2 are integer values determined by, for example, a constraint on the number of bits of a coded signal, a manual setting based on subjective image quality of a coded image, a relationship with a quantized coefficient, and/or statistical data of difference values between an input chrominance signal and a temporarily coded chrominance signal.

In this way, it is possible to reduce the error between the input chrominance signal and the coded chrominance signal, and to thereby suppress color distortion in the coded chrominance signal.

Here, the coded chrominance signal may be used in chrominance signal intra prediction, luminance signal intra prediction, chrominance signal inter-frame prediction, or luminance signal inter-frame prediction in a block to be processed. In this way, it is possible to further increase the prediction accuracy, and to thereby achieve a high coding efficiency.

Here, the direct-current component calculating unit 550 and the direct-current component calculating unit 555 may be used both in the calculation of the direct-current component of the input chrominance signal and in the calculation of the direct-current component of the temporarily coded chrominance signal. In this way, it is possible to realize the chrominance signal intra prediction unit 500 (the image coding apparatus 200) having a smaller circuit scale.

Here, the offset process may be performed also on a luminance signal in a similar manner. In this way, it is possible to generate a coded image signal that is closer to the input signal in terms of the luminance.

Embodiment 2

Next, a description is given of operations performed by the chrominance signal intra prediction unit 600 according to Embodiment 2.

The chrominance signal intra prediction unit 600 according to Embodiment 2 compression codes an image signal, and corresponds to a part of an image coding apparatus 200 which outputs coded image data.

Figure 7:
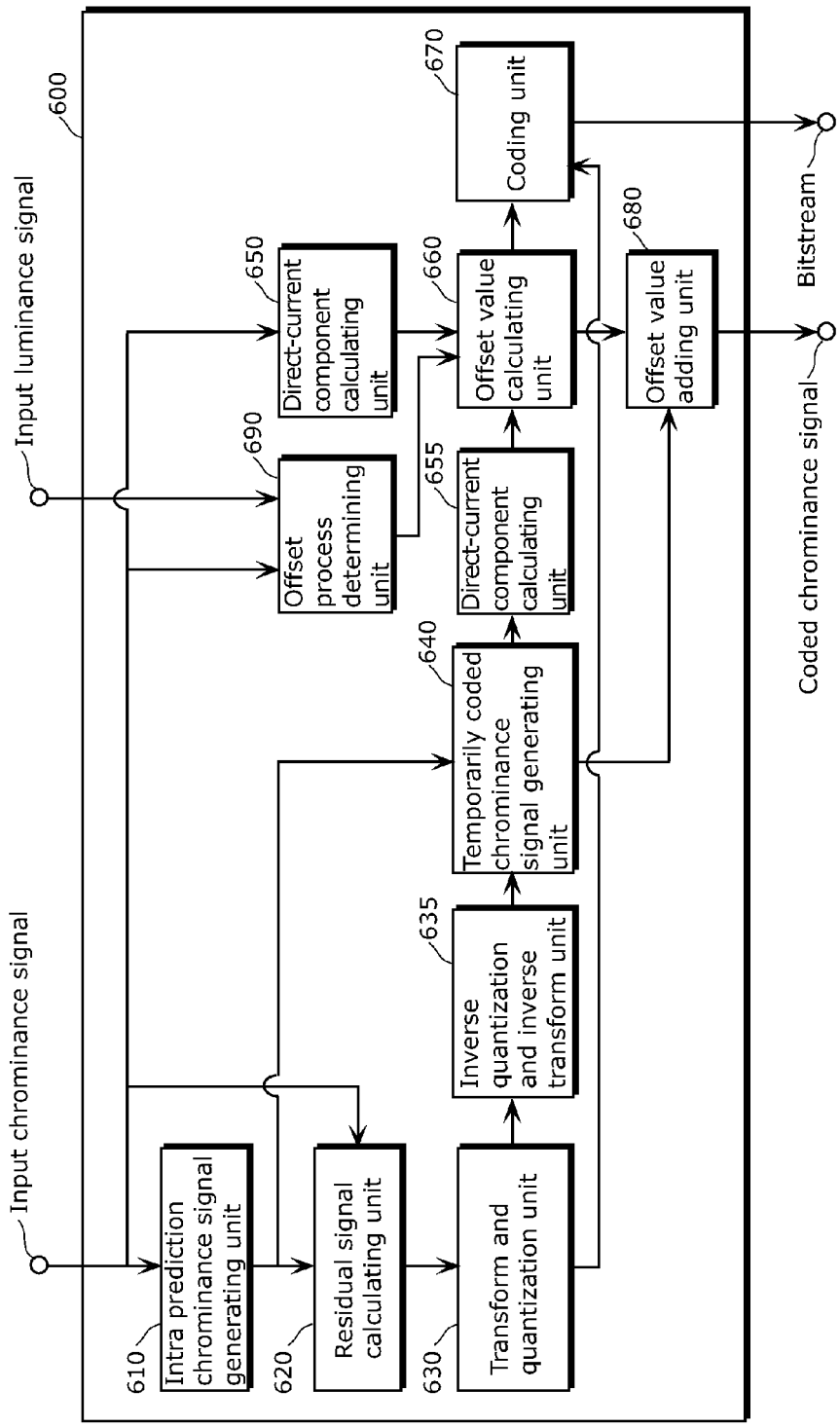
FIG. 7 is a block diagram of an exemplary chrominance signal intra prediction unit in image coding according to Embodiment 2.

FIG. 7 is a block diagram of a structure of a chrominance signal intra prediction unit 600 according to Embodiment 2.

As shown in FIG. 7, the chrominance signal intra prediction unit 600 includes an offset process determining unit 690, which is a difference from the chrominance signal intra prediction unit 500 in FIG. 4. The other elements of the chrominance signal intra prediction unit 600 are the same as those of the chrominance signal intra prediction unit 500, and thus are not described repeatedly.

Among the structural elements of the chrominance signal intra prediction unit 600, the offset process determining unit 690 that is the difference is described, and the same structural elements as those of the chrominance signal intra prediction unit 500 according to Embodiment 1 are not described again.

In Embodiment 2, a determination as to whether an offset process needs to be performed is made for each block, and an offset value is calculated for each of blocks for which the determination result is positive.

Figure 8:
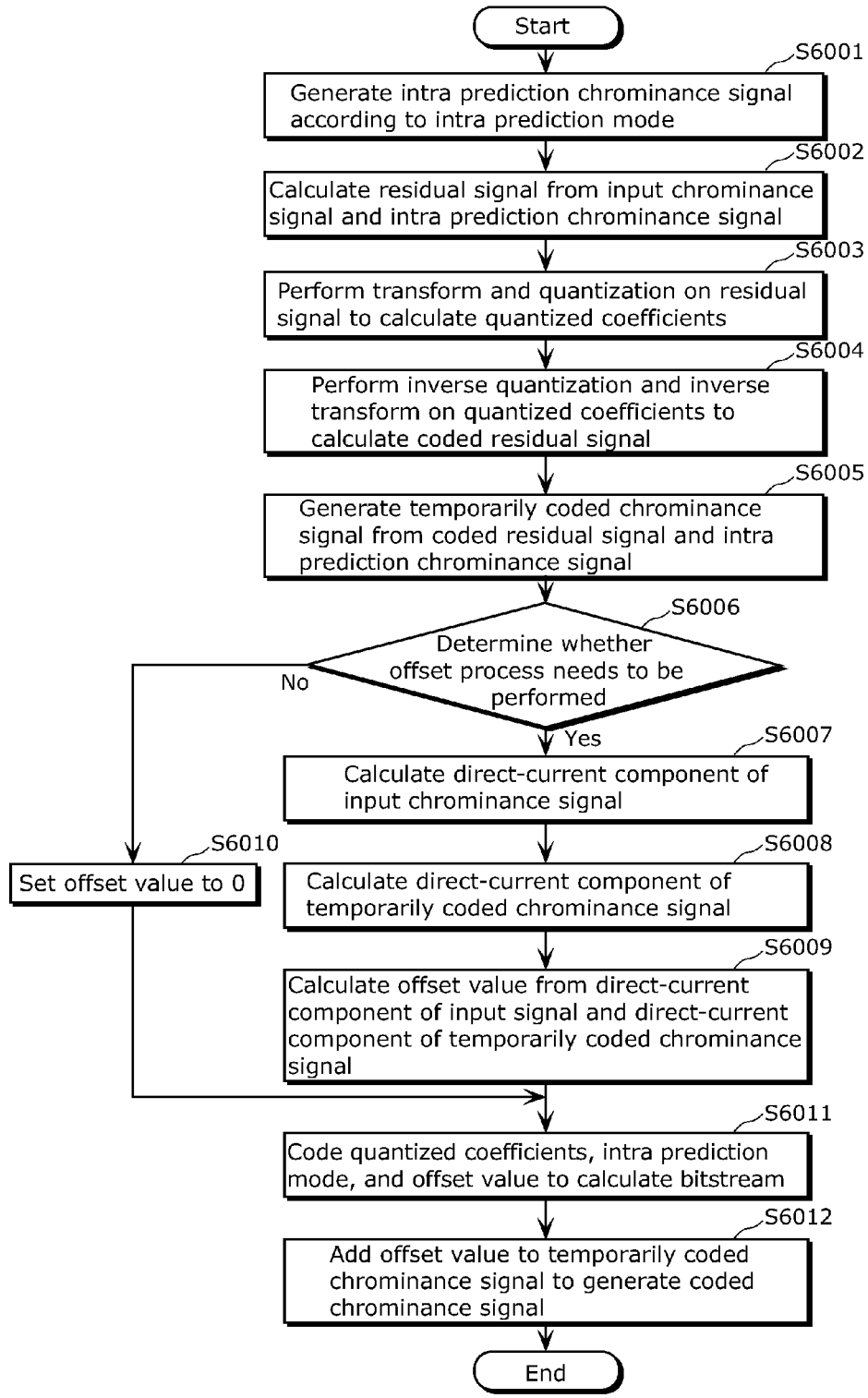
FIG. 8 is a flowchart of a chrominance signal intra prediction unit in the image coding according to Embodiment 2.

Next, a description is given of a chrominance signal intra prediction that is performed by the chrominance signal intra prediction unit 600. FIG. 8 is a flowchart of a chrominance signal intra prediction in an image coding method according to Embodiment 2. In FIG. 8, no detailed description is repeated for the same processes as those described in Embodiment 1. Accordingly, Steps S6006 to S6010 in FIG. 8 are mainly described.

In Step S6006, a determination is made as to whether an offset process needs to be performed on a current block to be processed. The determination is made using an input chrominance signal and an input luminance signal. As for color distortions made due to the errors between the input chrominance signals and the coded chrominance signals, subjective color distortions vary depending on the values of the chrominance signal and luminance signal even when the error amounts are the same. Thus, a determination that an offset process needs to be performed is made when an input signal is present in a range (hereinafter also referred to as a range A) in which color distortion in terms of subjective image quality is noticeable in a chrominance space and a luminance space.

The data structure in the range A may be represented using the maximum value and the minimum value of each of YUV or RGB components, or may be represented as a color map having three axes of YUV or RGB. In addition, the input signal used in the determination may be, for example, an average value of the input chrominance signal and the input luminance signal in the current block to be processed, a DC component obtained by performing frequency transform thereon, a median value, or the like thereof.

Here, the determination of whether the offset process needs to be performed on the current block may be made using only the chrominance space. In this way, it is possible to suppress the amount of operations and the circuit scale of the offset process determining unit 690.

When it is determined in Step S6006 that an offset process needs to be performed, an offset value is calculated in Steps S6007 to S6009 in the same manner as in Embodiment 1.

When it is determined in Step S6006 that no offset process needs to be performed, the coding unit 670 sets an offset value to a value for assigning a minimum bit amount in Step S6006. This eliminates the need to code information indicating the necessity of an offset process, and thereby makes it possible to make a determination on the necessity of the offset process, using the minimum bit amount.

In this way, it is possible to suppress increase in the bit amount of the bitstream, and to thereby suppress color distortion in the coded chrominance signal.

Here, when it is determined that no offset process needs to be performed, it is possible to code information about the necessity of the offset process in Step S6006. In this case, no offset value is added in Step S6012, which makes it possible to suppress increase in the operation amount.

Here, it is also good to determine in Step S6006 whether an offset process needs to be performed, using a temporarily coded chrominance signal. The image decoding apparatus side can generate the same signal as the temporarily coded chrominance signal, and determine whether an offset process needs to be performed. Thus, an offset value needs to be coded only when an offset process needs to be performed. In addition, no information related to offset process is coded when no offset process needs to be performed. In this way, it is possible to further suppress the bit amount of the bitstream.

Here, the offset process may be performed also on a luminance signal in a similar manner. In this way, it is possible to generate a coded image signal that is closer to the input signal in terms of the luminance.

Embodiment 3

Next, a description is given of operations performed by the chrominance signal intra prediction unit 700 according to Embodiment 3. The chrominance signal intra prediction unit 700 according to Embodiment 3 compression codes an image signal, and corresponds to a part of an image coding apparatus 200 which outputs coded image data.

Figure 9:
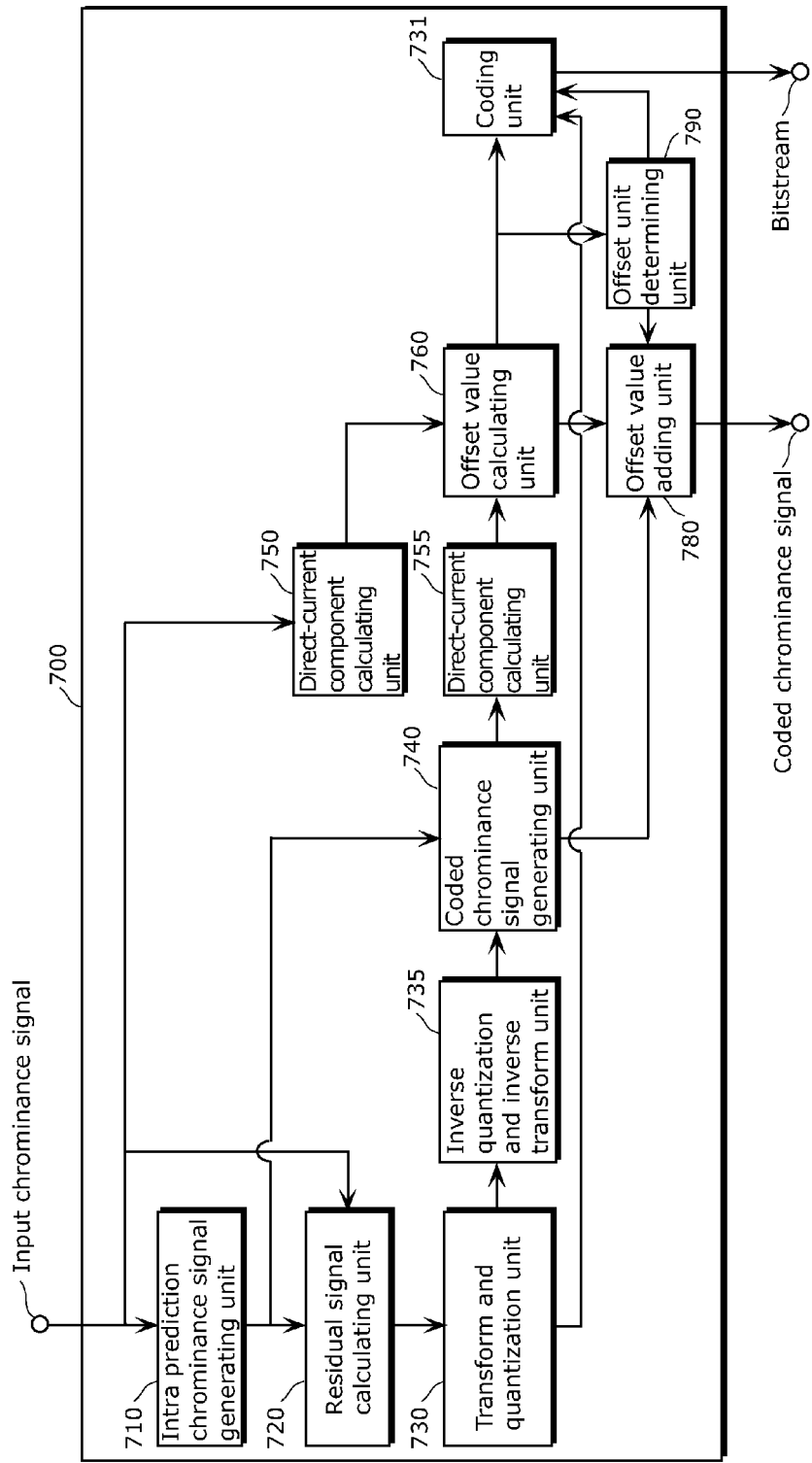
FIG. 9 is a block diagram of an exemplary chrominance signal intra prediction unit in image coding according to Embodiment 3.

FIG. 9 is a block diagram of a structure of a chrominance signal intra prediction unit 700 according to Embodiment 3.

As shown in FIG. 9, the chrominance signal intra prediction unit 700 includes an offset unit determining unit 790, which is a difference from the chrominance signal intra prediction unit 500 in FIG. 4. The other elements of the chrominance signal intra prediction unit 700 are the same as those of the chrominance signal intra prediction unit 500, and thus are not described repeatedly.

Among the structural elements of the chrominance signal intra prediction unit 700, the offset unit determining unit 790 that is the difference is described, and the same structural elements as those of the chrominance signal intra prediction unit 500 according to Embodiment 1 are not described again.

In Embodiment 3, it is possible to perform an offset process using the same offset value in a plurality of blocks adjacent to each other.

Figure 10:
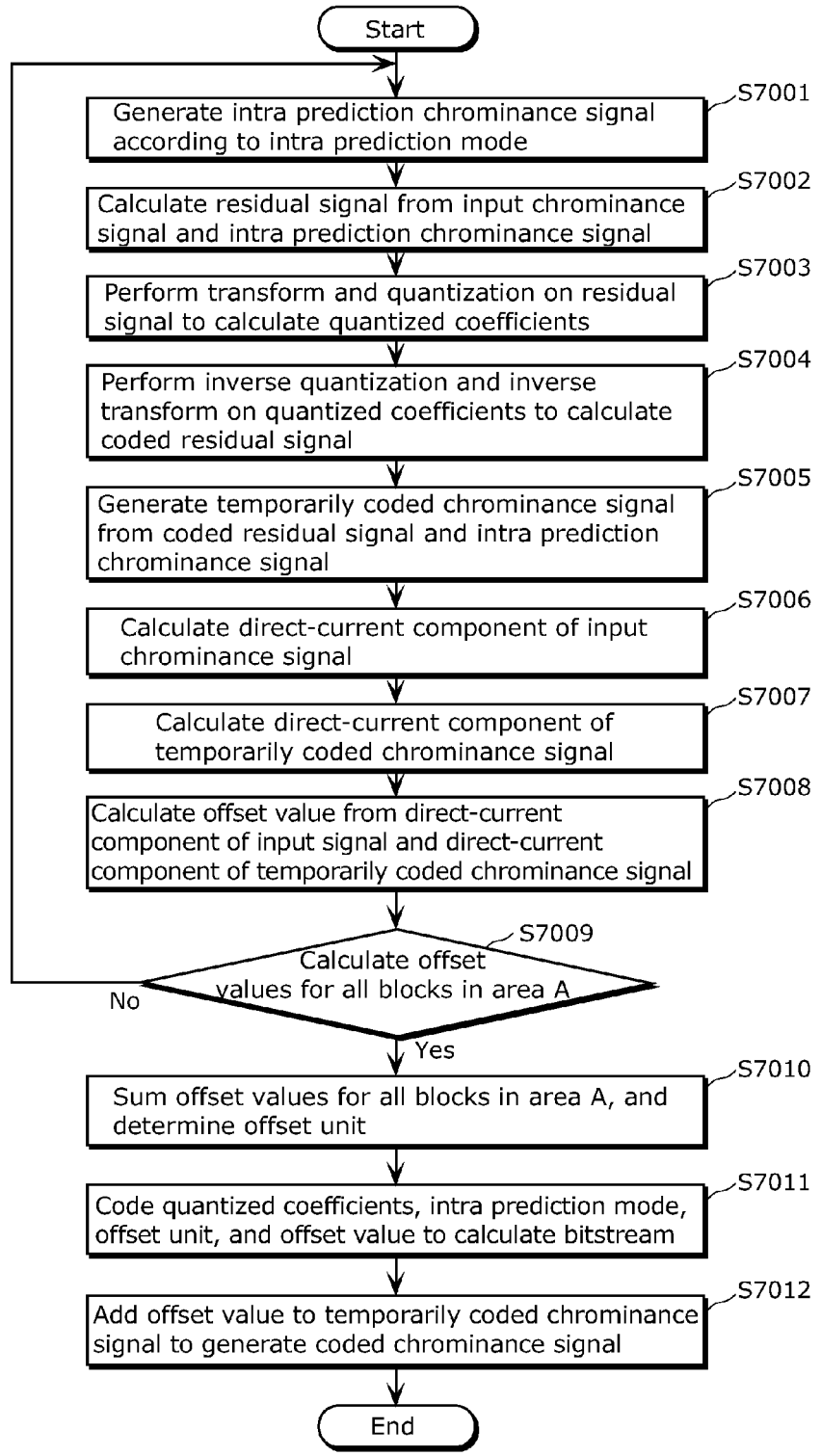
FIG. 10 is a flowchart of a chrominance signal intra prediction unit in the image coding according to Embodiment 3.

Next, a description is given of a chrominance signal intra prediction that is performed by the chrominance signal intra prediction unit 700. FIG. 10 is a flowchart of a chrominance signal intra prediction in an image coding method according to Embodiment 3. In FIG. 10, no detailed description is repeated for the same processes as those described in Embodiment 1. Accordingly, Steps S7009 to S7012 in FIG. 10 are mainly described.

First, in Step S7009, a determination is made as to whether an offset value is already calculated for each of blocks present in an area (hereinafter also referred to as an area A) including the plurality of blocks. When the offset value calculation of all the blocks is not yet completed, the offset value(s) calculated in Step S7008 is stored, and Steps S7001 to S7008 are repeated. When the offset value calculation of all the blocks is already completed, a transition is made to Step S7010.

Next, in Step S7010, the offset values for all the blocks in the area A calculated in Step S7009 are collected, and an offset unit is determined.

Next, in Step S7011, a bitstream is calculated by coding the quantized coefficients, the intra prediction mode, the offset unit, and the offset value.

Next, in Step S7012, a coded chrominance signal is generated by adding the offset value to the temporarily coded chrominance signal.

Here, as an example, a determination of an offset unit is described. First, for each of the offset values, an evaluation expression as shown in Expression 3 is calculated.

[Math. 3]

$$Eval(k) = \sum_{i=1}^{N} (jdg1(i) \times sBlk(i)) / \sum_{i=1}^{N} sBlk(i) \quad \text{(Expression 3)}$$

K denotes an offset value to be evaluated, N denotes the number of blocks in the area A, and sBLK(i) denotes the size of an ith block in the area A. As shown in Expression 4, jdg1(*i*) is a function for determining whether or not the offset value of the ith block in the area A is equal to k.

[Math. 4]

$$jdg1(i) = \begin{cases} 0, & \text{if } k \neq \text{offset} \\ 1, & \text{if } k = \text{offset} \end{cases} \quad \text{(Expression 4)}$$

Eval(k) indicates the rate of pixels having an offset value k in the area A.

Next, as shown in Expression 5, whether the maximum value of Eval(k) is larger than or equal to an arbitrary threshold value Th_oft is determined using a function jdg2.

[Math. 5]

$$jdg2 = \begin{cases} 0, & \text{if } \max(Eval(k)) < \text{Th\_oft} \\ 1, & \text{if } \max(Eval(k)) \geq \text{Th\_oft} \end{cases} \quad \text{(Expression 5)}$$

Figure 11A:
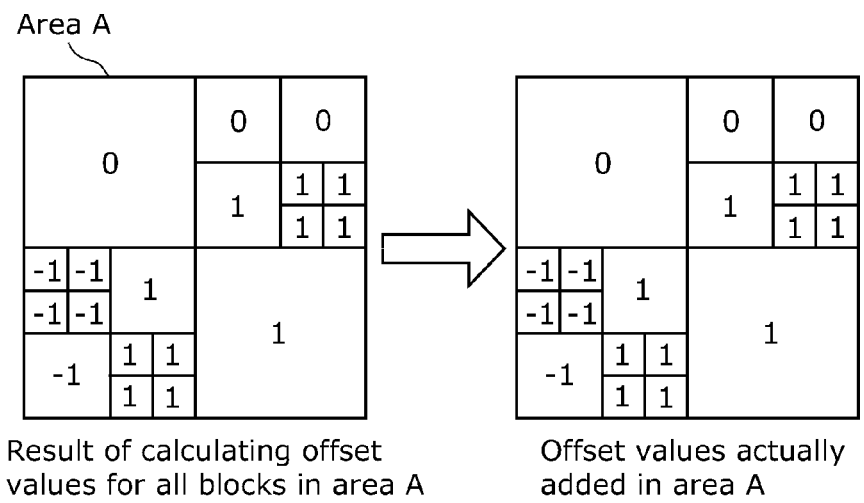
FIG. 11A is a schematic diagram of an example of an offset unit in a chrominance signal intra prediction in the image coding according to Embodiment 3.
Figure 11B:
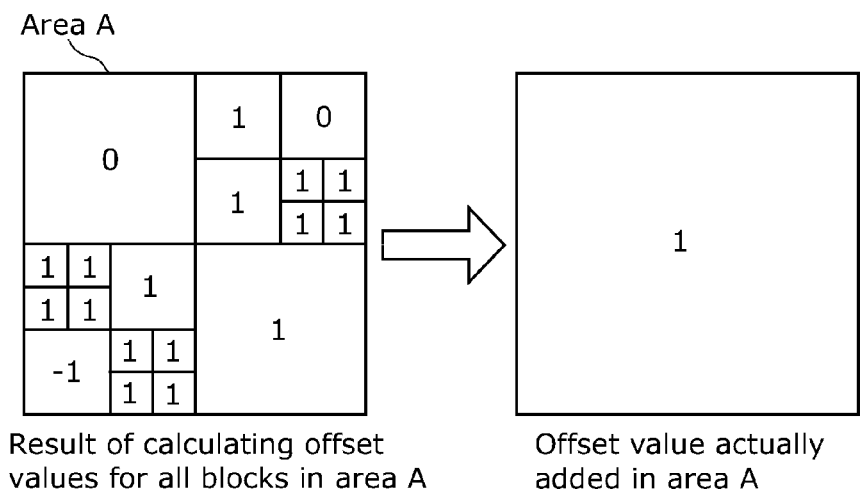
FIG. 11B is a schematic diagram of an example of an offset unit in a chrominance signal intra prediction in the image coding according to Embodiment 3.

Each of FIGS. 11A and 11B shows an example of a result obtained when Th_oft=6 is satisfied. When jdg2=0 is satisfied, assuming that no dominant offset value is present in the area A as shown in FIG. 11A, an offset process is performed using an offset value individually set for each block. When jdg2=1 is satisfied, assuming that a dominant offset value is present in the area A as shown in FIG. 11B, offset processes are performed using the same offset value for all the blocks.

In this way, it is possible to code, collectively, the offset values in a range larger than a block. Thus, it is possible to suppress increase in the bit amount of the coded signal, and to thereby suppress color distortion of the coded chrominance signal.

Here, such an offset unit may be determined by comparison using a cost function as in Expression 6.

[Math. 6]

$$\text{Cost} = \sum_{i=0}^{N} \text{diff}(\text{Input}(i), \text{oftRec}(i)) + \lambda \times \sum_{i=0}^{N} \text{bits}(\text{oftRec}(i)) \quad \text{(Expression 6)}$$

Input(i) denotes an ith block in the area A of the input signal, and oftRec(i) denotes an ith block in the area A of the coded signal. This may be true of only a chrominance signal, or both of a luminance signal and a chrominance signal. Here, diff(A,B) denotes a function for returning a difference value between a block A and a block B. The difference value is obtained by calculating, for example, an error absolute value.

Here, bit(A) denotes a function for returning the bit amount in the coding of the block A. A is a weighting parameter, and is set according to a QP or the like.

An offset unit is determined by calculating Expression 6 in both the case of using the offset value commonly set for all the blocks and the case of using the offset value individually set for each block, and comparing the results as shown in Expression 7.

[Math. 7]

$$jdg3 = \begin{cases} 0, & \text{if cost\_inv} < \text{cost\_all} \\ 1, & \text{if cost\_inv} \geq \text{cost\_all} \end{cases} \quad \text{(Expression 7)}$$

Here, cost_inv denotes a cost value in Expression 6 in the case of using an offset value individually set for each block, and cost_all denotes the cost value in Expression 6 in the case of using the offset value commonly set for all the blocks. When jdg3=0 is satisfied, an offset process is performed using an offset value individually set for each block. When jdg3=1 is satisfied, an offset process is performed using the same offset value for all the blocks. In this way, it is possible to perform coding that balances the bit amount and the subjective color distortion.

Here, as shown in Embodiment 2, it is also good to code only blocks that require an offset process. In other words, no coding is performed when no offset process is required. In this way, it is possible to further suppress the bit amount of the coded signal.

Here, the offset process may be performed also on a luminance signal in a similar manner. In this way, it is possible to generate a coded image signal that is closer to the input signal in terms of the luminance.

Embodiment 4

Figure 15:
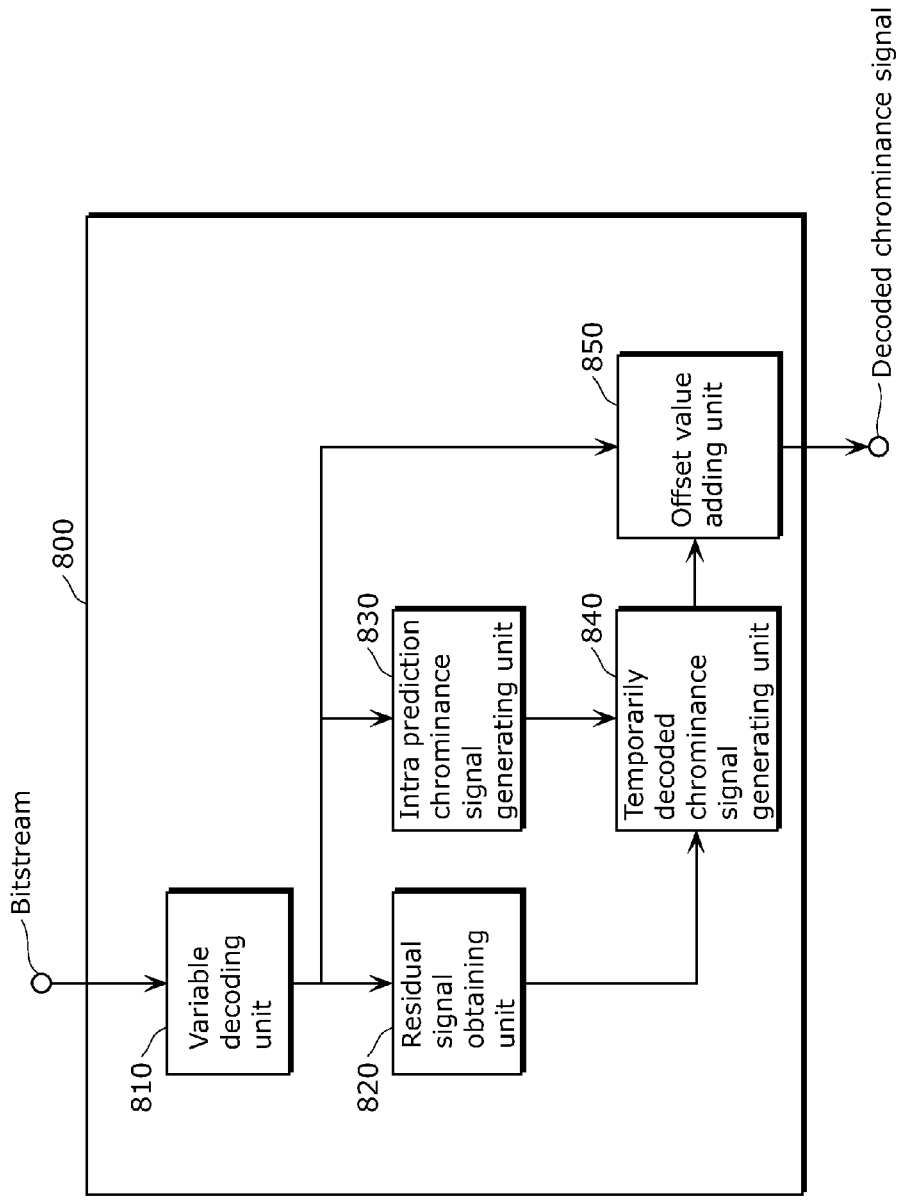
FIG. 15 is a block diagram of a chrominance signal intra prediction unit in image decoding according to Embodiment 4.

A description is given of a structure of a chrominance signal intra prediction unit 800 which performs an intra prediction method in an offset process of a chrominance signal according to this embodiment. FIG. 15 is a block diagram of a structure of a chrominance signal intra prediction unit 800 according to Embodiment 4. Here, as described later, the chrominance signal intra prediction unit 800 according to Embodiment 4 decodes a coded signal, and corresponds to a part of the image decoding apparatus 400 which outputs decoded image data.

As shown in FIG. 15, the chrominance signal intra prediction unit 800 includes a variable length decoding unit 810, a residual signal obtaining unit 820, an intra prediction chrominance signal generating unit 830, a temporarily decoded chrominance signal generating unit 840, and an offset value adding unit 850.

Operations performed by the conventional chrominance signal intra prediction unit 800 according to Embodiment 4 are described in detail with reference to FIG. 16.

Figure 16:
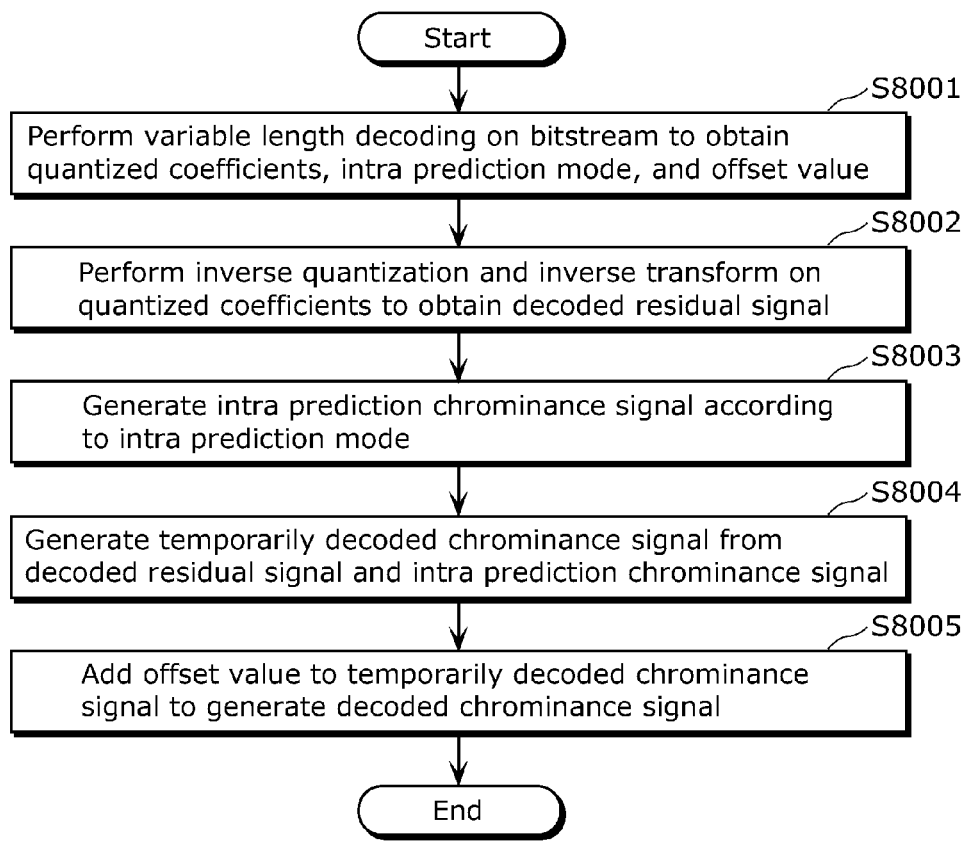
FIG. 16 is a flowchart of operations performed by the chrominance signal intra prediction unit in the image decoding according to Embodiment 4.

FIG. 16 is a flowchart of processes performed by the chrominance signal intra prediction unit 800.

First, a variable length decoding is performed on a bitstream to obtain quantized coefficients, an intra prediction mode, and an offset value (Step S8001).

Next, inverse quantization and inverse transform are performed on the quantized coefficients to obtain a decoded residual signal (Step S8002). The decoded residual signal is already approximated in a rougher segment through the quantization in the coding. Thus, when the decoded residual signal is used to generate a decoded chrominance signal, an error from the original input signal is made.

Next, an intra prediction chrominance signal is generated according to an intra prediction mode (Step S8003). The intra prediction mode of the chrominance signal is an index number indicating a method of generating the intra prediction chrominance signal. Such an intra prediction mode is determined for each block in intra prediction in coding. The intra prediction chrominance signal is generated by using, as necessary, a coded luminance signal of an adjacent block, a coded chrominance signal of the adjacent block, a coded luminance signal of a current block to be processed according to the intra prediction mode.

Next, a chrominance signal is generated from the decoded residual signal and the intra prediction chrominance signal (Step S8004). A temporarily decoded chrominance signal is calculated by adding the decoded residual signal and the intra prediction chrominance signal.

Next, a decoded chrominance signal is generated by adding the offset value to the temporarily decoded chrominance signal (Step S8005). The offset value is a value calculated in the intra prediction in the coding.

In this way, it is possible to reduce the error between the input chrominance signal before the coding and the decoded chrominance signal, and to thereby suppress color distortion in the decoded chrominance signal.

Here, the offset process may be performed also on a luminance signal in a similar manner. In this way, it is possible to generate a decoded image signal that is closer to the input signal in terms of the luminance.

In addition, FIG. 21 is an example showing a syntax in Embodiment 4, according to the HEVC standard (Non-patent Literature 3). When coding an image signal of a YUV format, offset values for U and V in each prediction unit are decoded next to the intra prediction mode of the chrominance signal.

Embodiment 5

Next, a description is given of operations performed by the chrominance signal intra prediction unit 900 according to Embodiment 5. Here, as described later, the chrominance signal intra prediction unit 900 according to Embodiment 5 decodes a coded signal, and corresponds to a part of the image decoding apparatus 400 which outputs decoded image data.

Figure 17:
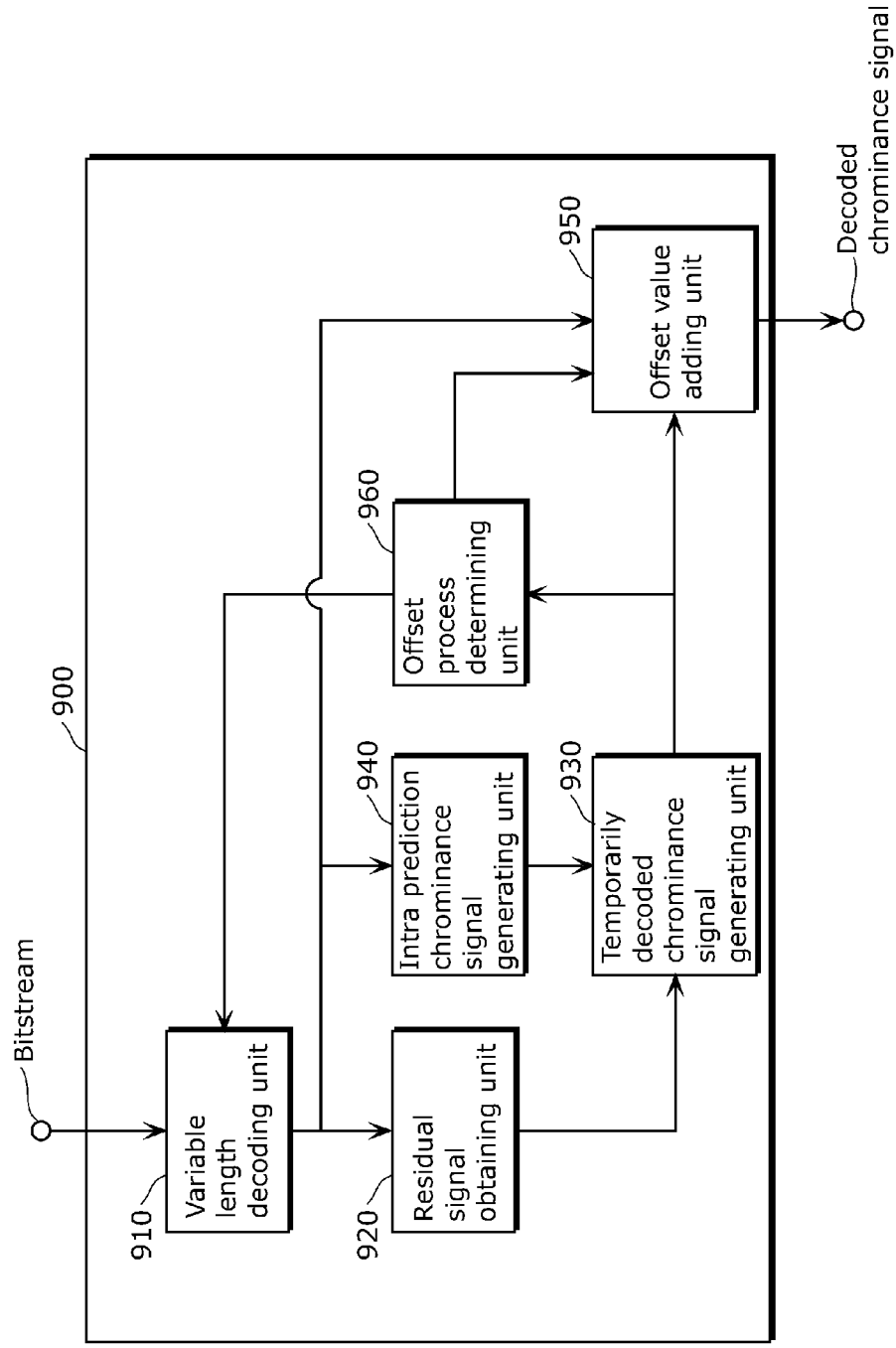
FIG. 17 is a block diagram of a chrominance signal intra prediction unit in image decoding according to Embodiment 5.

FIG. 17 is a block diagram of a structure of the chrominance signal intra prediction unit 900 according to Embodiment 5.

As shown in FIG. 17, the chrominance signal intra prediction unit 900 includes an offset process determining unit 960, which is a difference from the chrominance signal intra prediction unit 800 in FIG. 15. The other elements of the chrominance signal intra prediction unit 900 are the same as those of the chrominance signal intra prediction unit 800, and thus are not described repeatedly.

Among the structural elements of the chrominance signal intra prediction unit 900, the offset process determining unit 970 that is the difference is described, and the same structural elements as those of the chrominance signal intra prediction unit 800 according to Embodiment 4 are not described again.

In Embodiment 5, a determination as to whether an offset process needs to be performed is made for each block, and an offset process is performed for each block for which the determination result is positive.

Figure 18:
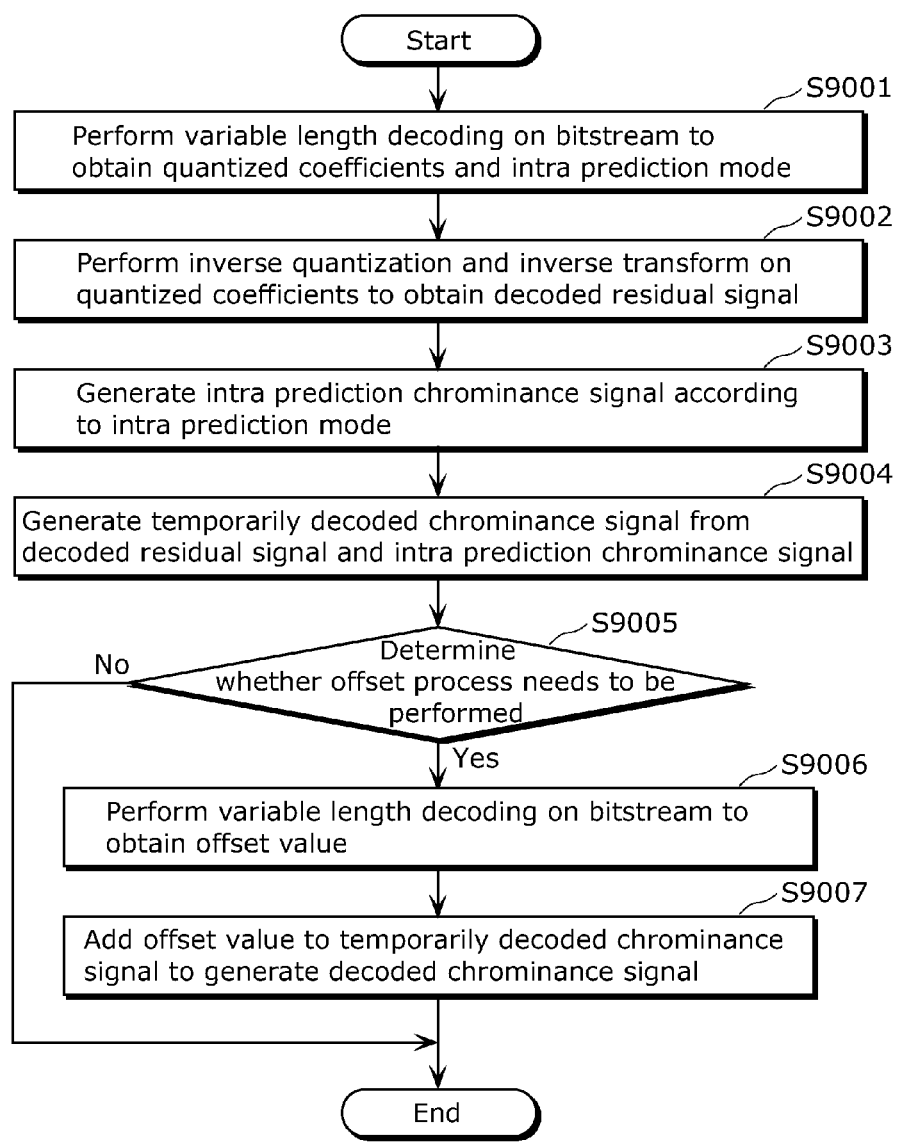
FIG. 18 is a flowchart of operations performed by the chrominance signal intra prediction unit in the image decoding according to Embodiment 5.

Next, a description is given of a chrominance signal intra prediction that is performed by the chrominance signal intra prediction unit 900. FIG. 18 is a flowchart of a chrominance signal intra prediction in an image decoding method according to Embodiment 5. In FIG. 18, no detailed description is repeated for the same processes as those described in Embodiment 4. Accordingly, Steps S9005 to S9007 in FIG. 18 are mainly described.

In Step S9005, a determination as to whether an offset process needs to be performed is made using a decoded luminance signal and the temporarily decoded chrominance signal of a current block to be processed. This determination is made according to the same method as in Embodiment 2. As for color distortions made in the decoded chrominance signals, subjective color distortions vary depending on the values of the chrominance signal and luminance signal even when the error amounts in the input chrominance signal before the coding and in the decoded chrominance signal are the same. Thus, a determination that an offset process needs to be performed is made when the temporarily decoded chrominance signal is present in a range (hereinafter also referred to as a range A) in which color distortion in terms of the subjective image quality is noticeable in a chrominance space and a luminance space.

The data structure in the range A may be represented using the maximum value and the minimum value of each of YUV or RGB components, or may be represented as a color map having three axes of YUV or RGB. In addition, the input signal used in the determination may be, for example, an average value of the input chrominance signal and the input luminance signal in the current block to be processed, a DC component obtained by performing frequency transform thereon, a median value, or the like thereof.

When it is determined in Step S9005 that an offset process needs to be performed, Steps S9006 to S9007 are performed.

In Step S9006, variable length decoding is performed on the bitstream, to obtain the offset value, and the offset process is performed. Next, in Step S9007, a decoded chrominance signal is generated by adding the offset value to the temporarily decoded chrominance signal.

When it is determined in Step S9005 that no offset process needs to be performed, no offset process is performed, and the raw temporarily decoded chrominance signal becomes the decoded chrominance signal.

In this way, it is possible to suppress increase in the bit amount of the bitstream, and to thereby suppress color distortion in the decoded chrominance signal.

Here, the offset process may be performed also on a luminance signal in a similar manner. In this way, it is possible to generate a decoded image signal that is closer to the input signal in terms of the luminance.

Embodiment 6

Next, a description is given of operations performed by the chrominance signal intra prediction unit 4000 according to Embodiment 6. Here, as described later, the chrominance signal intra prediction unit 4000 according to Embodiment 6 decodes a coded signal, and corresponds to a part of the image decoding apparatus 400 which outputs decoded image data.

Figure 19:
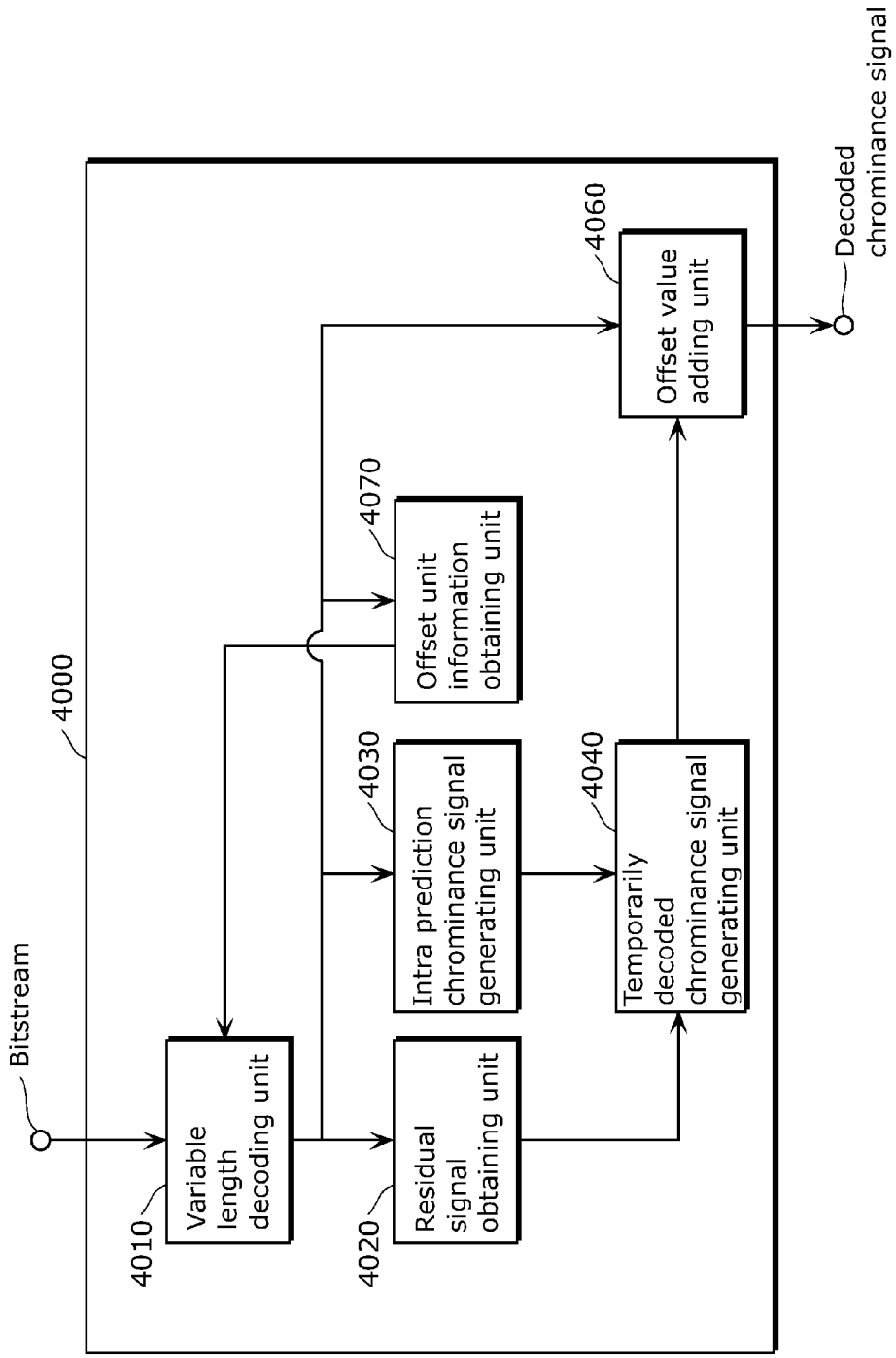
FIG. 19 is a block diagram of a chrominance signal intra prediction unit in image decoding according to Embodiment 6.

FIG. 19 is a block diagram of a structure of the chrominance signal intra prediction unit 4000 according to Embodiment 6.

As shown in FIG. 19, the chrominance signal intra prediction unit 4000 includes an offset unit information obtaining unit 4070, which is a difference from the chrominance signal intra prediction unit 800 in FIG. 15. The other elements of the chrominance signal intra prediction unit 4000 are the same as those of the chrominance signal intra prediction unit 800, and thus are not described repeatedly.

Among the structural elements of the chrominance signal intra prediction unit 4000, the offset process determining unit 4070 that is the difference is described, and the same structural elements as those of the chrominance signal intra prediction unit 800 according to Embodiment 4 are not described again.

In Embodiment 6, it is possible to perform an offset process using the same offset value in a plurality of blocks adjacent to each other.

Figure 20:
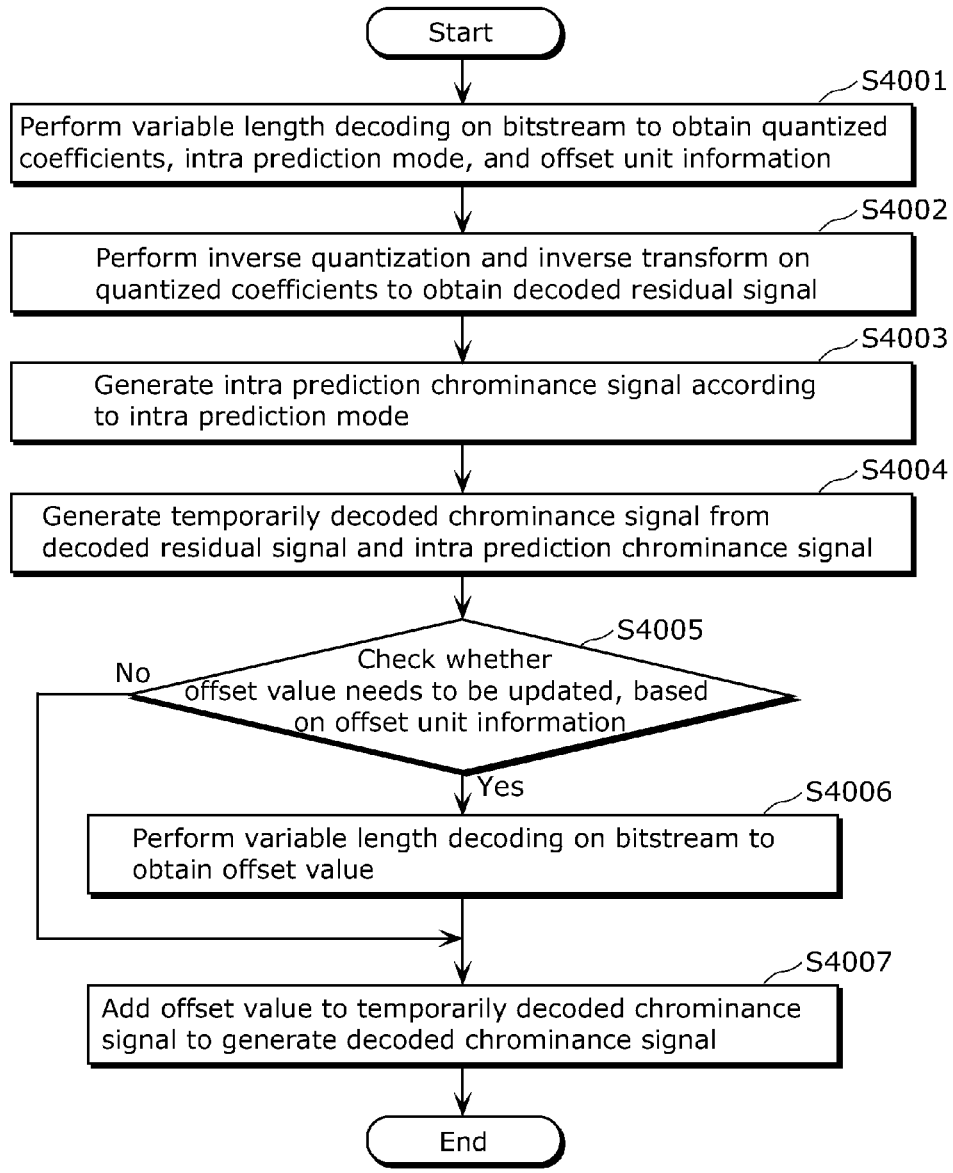
FIG. 20 is a flowchart of operations performed by the chrominance signal intra prediction unit in the image decoding according to Embodiment 6.

Next, a description is given of a chrominance signal intra prediction that is performed by the chrominance signal intra prediction unit 4000. FIG. 20 is a flowchart of a chrominance signal intra prediction in an image decoding method according to Embodiment 6. In FIG. 20, no detailed description is repeated for the same processes as those described in Embodiment 4. Accordingly, Step S4001 and Steps S4005 to S4007 in FIG. 20 are mainly described.

In Step S4001, variable length decoding is performed on a bitstream, to obtain quantized coefficients, an intra prediction mode, and offset unit information. The offset unit information is information about whether, in the area A including a plurality of blocks, the offset value commonly set for all the blocks is used, or an offset value individually set for each block is used.

In Step S4005, the necessity of update of the offset value is checked based on the offset unit information. When using the same offset value for all the blocks in the area A, the offset value is updated only when the offset process of all the blocks in the area A is completed. When using the offset value individually set for each block in the area A, the offset value is updated for each block.

When the offset value needs to be updated, in Step S4006, variable length decoding is performed on the bitstream to obtain the offset value. The offset value is a value calculated in the intra prediction in the coding.

Next, in Step S4007, a decoded chrominance signal is generated by adding the offset value to the temporarily decoded chrominance signal.

In this way, it is possible to code, collectively, the offset values in a range larger than a block. Thus, it is possible to suppress increase in the bit amount of the coded signal, and to thereby suppress color distortion of the decoded chrominance signal.

Here, the offset process may be performed also on a luminance signal in a similar manner. In this way, it is possible to generate a decoded image signal that is closer to the input signal in terms of the luminance.

In addition, FIG. 22 is an example showing a syntax in Embodiment 6, according to the HEVC standard (Non-patent Literature 3). When decoding an I-slice of an image signal of a YUV format, offset values for U and V in each coding tree that is a group of coding units are decoded next to the intra prediction mode of the chrominance signal.

Embodiment 7

In Embodiment 7, whether or not an offset process needs to be performed is made using a block, a slice, a picture, or a quantization parameter that is set when starting coding on a moving picture. FIG. 23 shows associations between block sizes, quantization parameters, quantization steps, and signal levels that can be represented in a spatial domain, according to the HEVC standard (Non-patent Literature 3). When the signal level that can be represented in the spatial domain exceeds 1, an error between a chrominance signal before coding and a coded chrominance signal is always made in the processes of quantization and inverse quantization. For example, in the case where a block size is 16×16 pixels, and a quantization parameter is 28, it can be determined that an offset process needs to be performed to reduce the error between the chrominance signal before the coding and the coded chrominance signal. In this way, the use of the quantization parameter eliminates the need to code an offset value in the case where no offset process is required and a flag related to the necessity of the offset process, and to thereby increase the coding efficiency.

Figure 24:
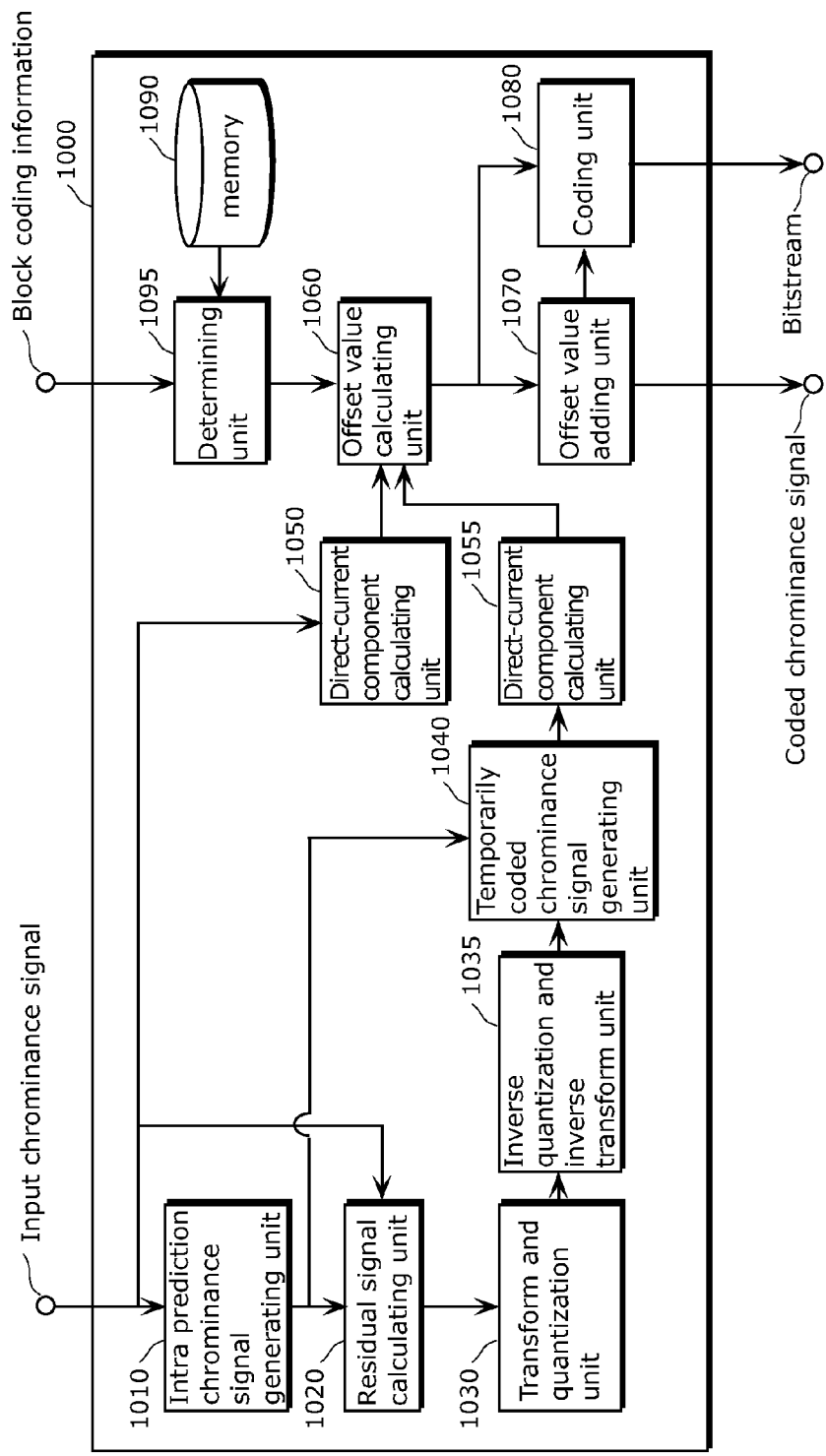
FIG. 24 is a block diagram of a chrominance signal intra prediction unit in the image coding according to Embodiment 7.

Hereinafter, first, a description is given of an exemplary structure of a chrominance signal intra prediction unit of an image coding apparatus according to Embodiment 7. FIG. 24 is a block diagram of a structure of the chrominance signal intra prediction unit 1000 according to Embodiment 7. Among the structural elements of the chrominance signal intra prediction unit 1000, a memory 1090 and a determining unit 1095 that are the differences are described, and the same structural elements as those of the chrominance signal intra prediction unit 500 according to Embodiment 1 are not described again.

The memory 1090 stores information indicating the associations of the block sizes, quantization parameters, quantization steps, signal levels that can be represented in the spatial domain, etc.

The determining unit 1095 determines whether or not an offset process needs to be performed on a current block to be coded, based on block coding information. The block coding information includes, specifically, the block size of the current block and the quantization parameter. The quantization parameter is set when starting coding on the block, slice, picture, or moving picture. The determining unit 1095 refers to information in the memory 1090, using the obtained block coding information. Here, when the representable signal level exceeds a preset value A, it is determined that an offset process needs to be performed. When no offset process needs to be performed, no offset value is calculated and coded.

Figure 25:
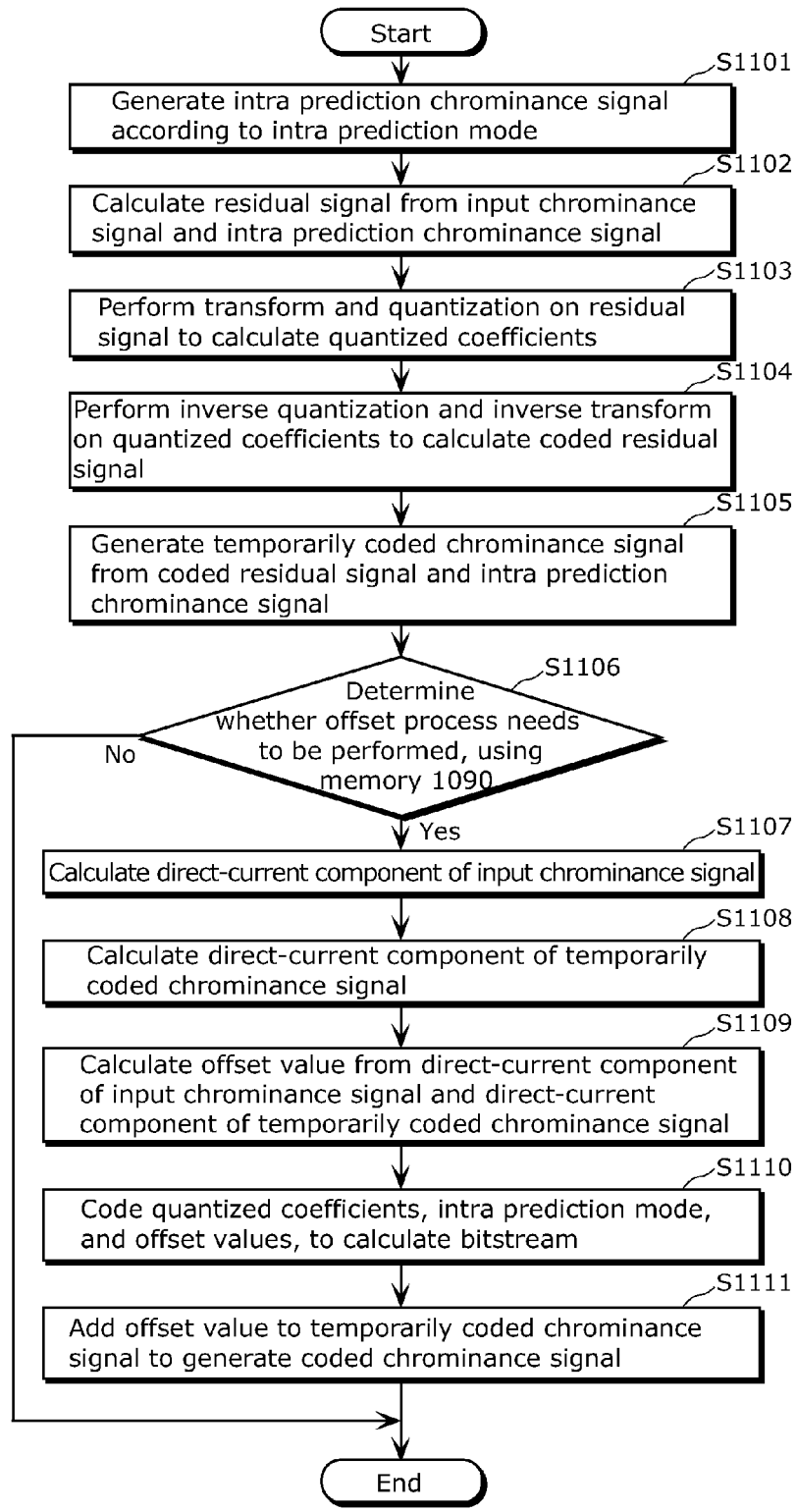
FIG. 25 is a flowchart of a chrominance signal intra prediction unit in the image coding according to Embodiment 7.

Next, a description is given of a chrominance signal intra prediction that is performed by the chrominance signal intra prediction unit 1000. FIG. 25 is a flowchart of a chrominance signal intra prediction in an image coding method according to Embodiment 7. In FIG. 25, no detailed description is repeated for the same processes as those described in Embodiment 1. Accordingly, Step S1106 in FIG. 25 is mainly described.

In S1106, the determining unit 1095 refers to information in the memory 1090, using the block coding information including the block size and quantization parameter of the current block to be coded. Here, when the representable signal level exceeds a preset value A, judging from the block size and quantization parameter of the current block, it is determined that an offset process is required, and Steps S1107 to S1111 are performed. On the other hand, the representable signal level is below the preset value A, it is determined that no offset process is required, and the current process is terminated.

Figure 26:
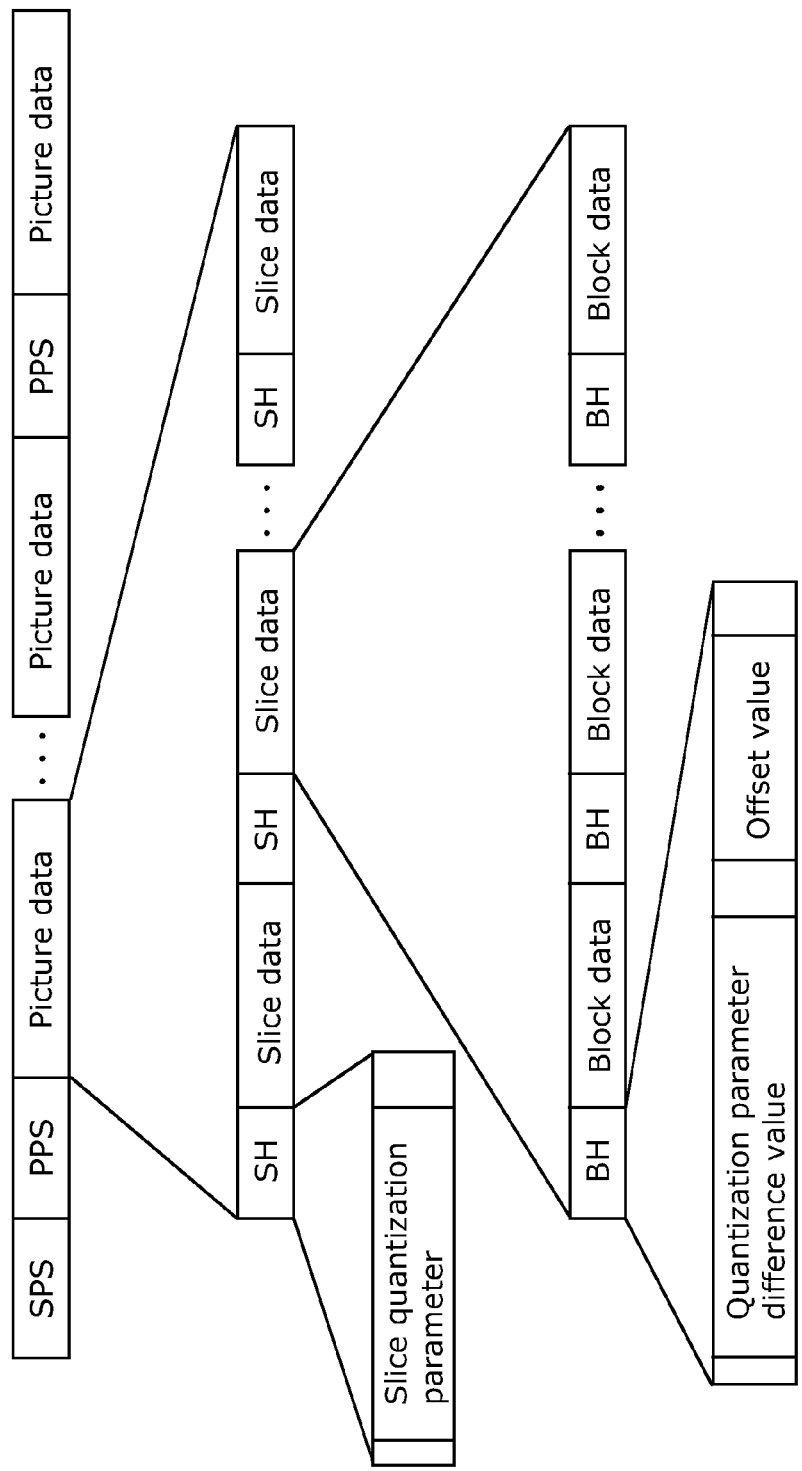
FIG. 26 is a schematic diagram of an exemplary coded stream in Embodiment 7.

Here, a bitstream in Embodiment 7 is described. The chrominance signal intra prediction unit 1000 generates a bitstream by coding a moving picture. As shown in FIG. 26, the bitstream includes header portions such as Sequence Parameter Sets (SPSs) and Picture Parameter Sets (PPSs), and picture data that is coded image data.

The picture data further includes a slice header (SH) and slice data. The slice data includes coded image data included in a slice. The slice data further includes a block header (BH) and block data. The block data includes coded image data included in a block. The block is an example of a processing unit in the coding of a picture, and corresponds to one of areas obtained by dividing the picture. Here, the block can be further divided into smaller processing units.

The header portion includes control information used to decode the block data. More specifically, as shown in FIG. 26, an SH includes a quantization parameter. This is used, in the decoding of the slice, as a reference value for the quantization parameter that is used commonly to the blocks in the slice. Next, a BH includes a quantization parameter difference value. An image decoding apparatus can obtain the quantization parameter used to decode the blocks by adding a quantization parameter difference value to the slice quantization parameter. Here, the SPS and the PPS may include a quantization parameter that can be used similarly to the slice quantization parameter.

Figure 27:
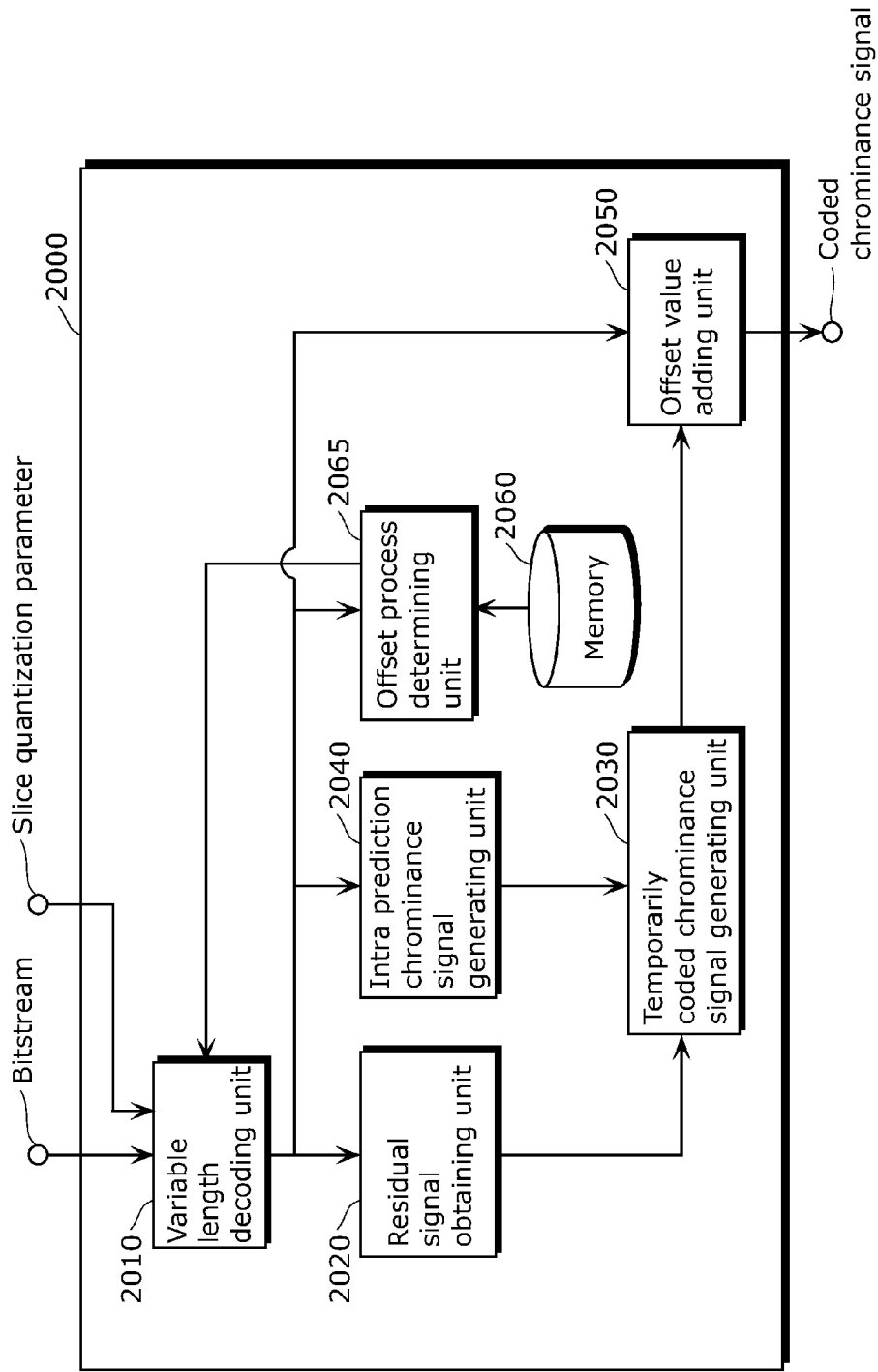
FIG. 27 is a block diagram of a chrominance signal intra prediction unit in the image decoding according to Embodiment 7.

Hereinafter, a description is given of an exemplary structure of a chrominance signal intra prediction unit of an image coding apparatus according to Embodiment 7. FIG. 27 is a block diagram of a structure of a chrominance signal intra prediction unit 2000 according to Embodiment 7. Among the structural elements of the chrominance signal intra prediction unit 2000, a variable length decoding unit 2010, a memory 2060 and an offset process determining unit 2065 that are the differences are described, and the same structural elements as those of the chrominance signal intra prediction unit 800 according to Embodiment 4 are not described again.

The memory 2060 stores information indicating the associations of the block sizes, quantization parameters, quantization steps, signal levels that can be represented in the spatial domain, etc.

The variable length decoding unit 2010 obtains a quantization parameter of a current block to be decoded by adding a slice quantization parameter already decoded on a slice basis and a quantization parameter difference value extracted from a bitstream of the current block to be decoded. In addition, the variable length decoding unit 2010 extracts the block size of the current block from the bitstream. Next, the quantization parameter and the block size are output to the offset process determining unit 2065.

The offset process determining unit 2065 refers to the memory 2060, using the quantization parameter and block size obtained from the variable length decoding unit 2010. Here, when the representable signal level exceeds a preset value A, it is determined that an offset process needs to be performed. In other words, since the offset value is already inserted in the bitstream, the determination result is output to the variable length decoding unit 2010.

Figure 28:
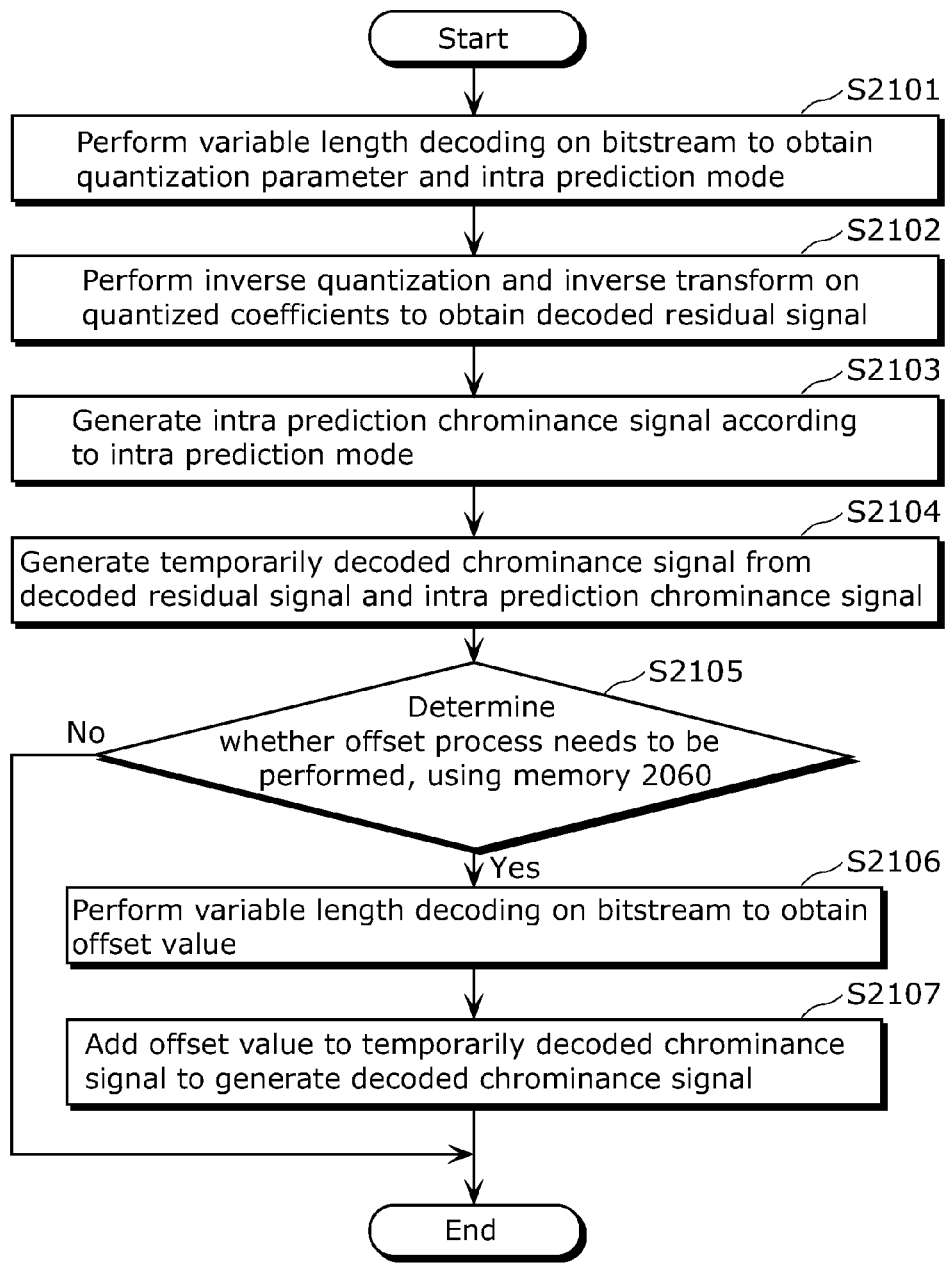
FIG. 28 is a flowchart of operations performed by a chrominance signal intra prediction unit in the image decoding according to Embodiment 7.

Next, a description is given of a chrominance signal intra prediction that is performed by the chrominance signal intra prediction unit 2000. FIG. 28 is a flowchart of a chrominance signal intra prediction in an image decoding method according to Embodiment 7. In FIG. 28, no detailed description is repeated for the same processes as those described in Embodiment 4. Accordingly, Step S2105 in FIG. 28 is mainly described.

In S2105, the offset process determining unit 2065 refers to information in the memory 2060, using the block coding information including the block size and quantization parameter of the current block to be coded. Here, when the representable signal level exceeds a preset value A, judging from the block size and quantization parameter of the current block, it is determined that an offset process is required, and Steps S2106 to S2107 are performed. On the other hand, the representable signal level is below the preset value A, it is determined that no offset process is required, and the current process is terminated.

Here, the determining unit 1095 and the offset process determining unit 2065 may execute the determination as to an offset process, using a relational expression of the block size, quantization parameter, and representable signal level without using the memory 1090 and the memory 2060.

Here, the determining unit 1095 and the offset process determining unit 2065 may execute the determination, using only the slice quantization parameter. In this case, the necessity of an offset process is determined on a slice basis.

Here, it is possible to determine parameters p1 and p2 required for offset value quantization and clipping executed by the offset value calculating unit 1060, using the associations between the block size, quantization parameter, quantization step, and signal level representable in the spatial domain stored in the memory 1090. The signal level representable in the spatial domain indicates the accuracy of the offset value required to execute the offset process. The parameters p1 and p2 may be included in a table together with the signal level representable in the spatial domain and stored in the memory 1090, or may be calculated according to a relational expression (related with the signal level representable in the spatial domain).

Embodiment 8

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 29:
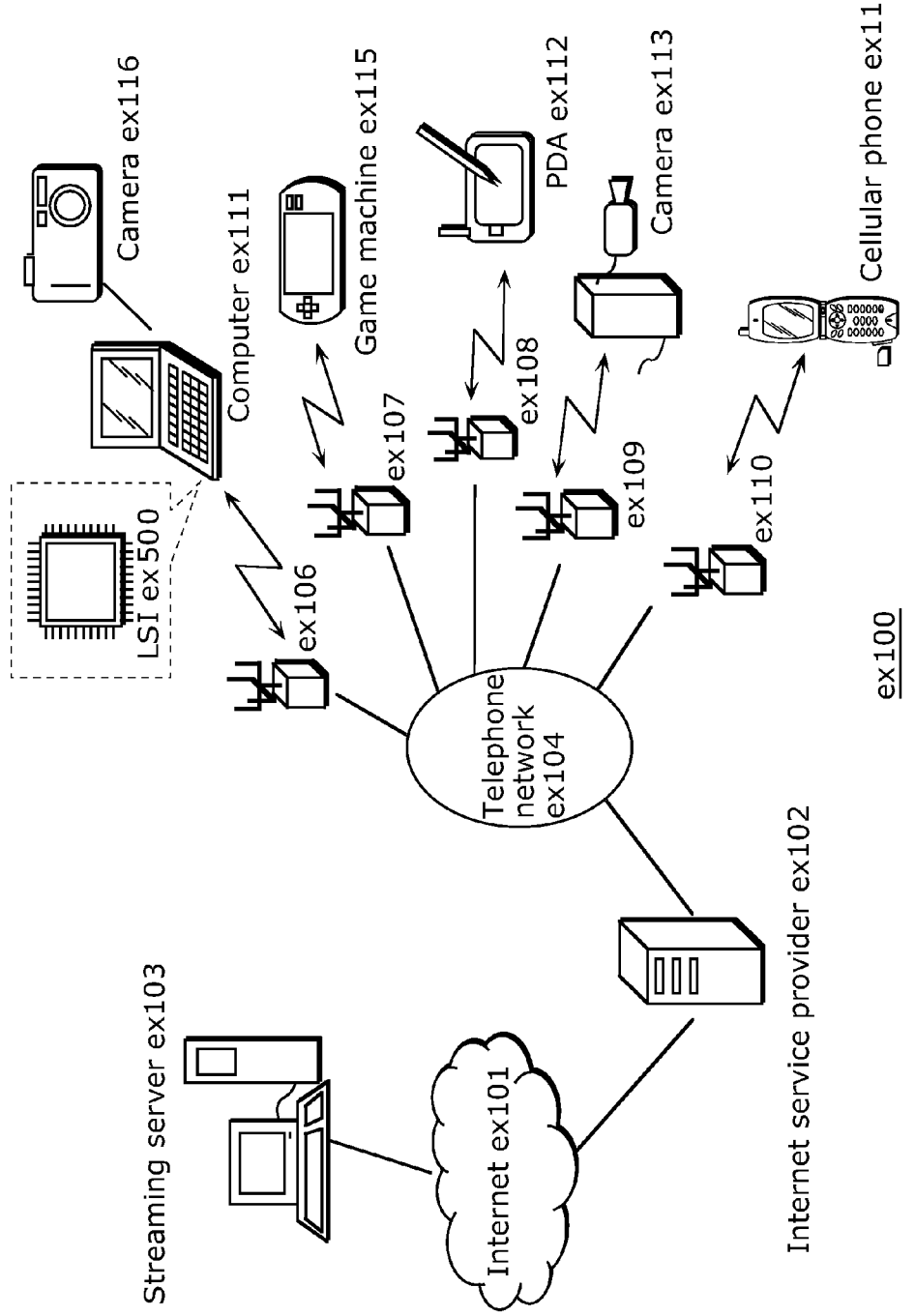
FIG. 29 shows an overall configuration of a content providing system for implementing content distribution services.

FIG. 29 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 29, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video.

Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 30:
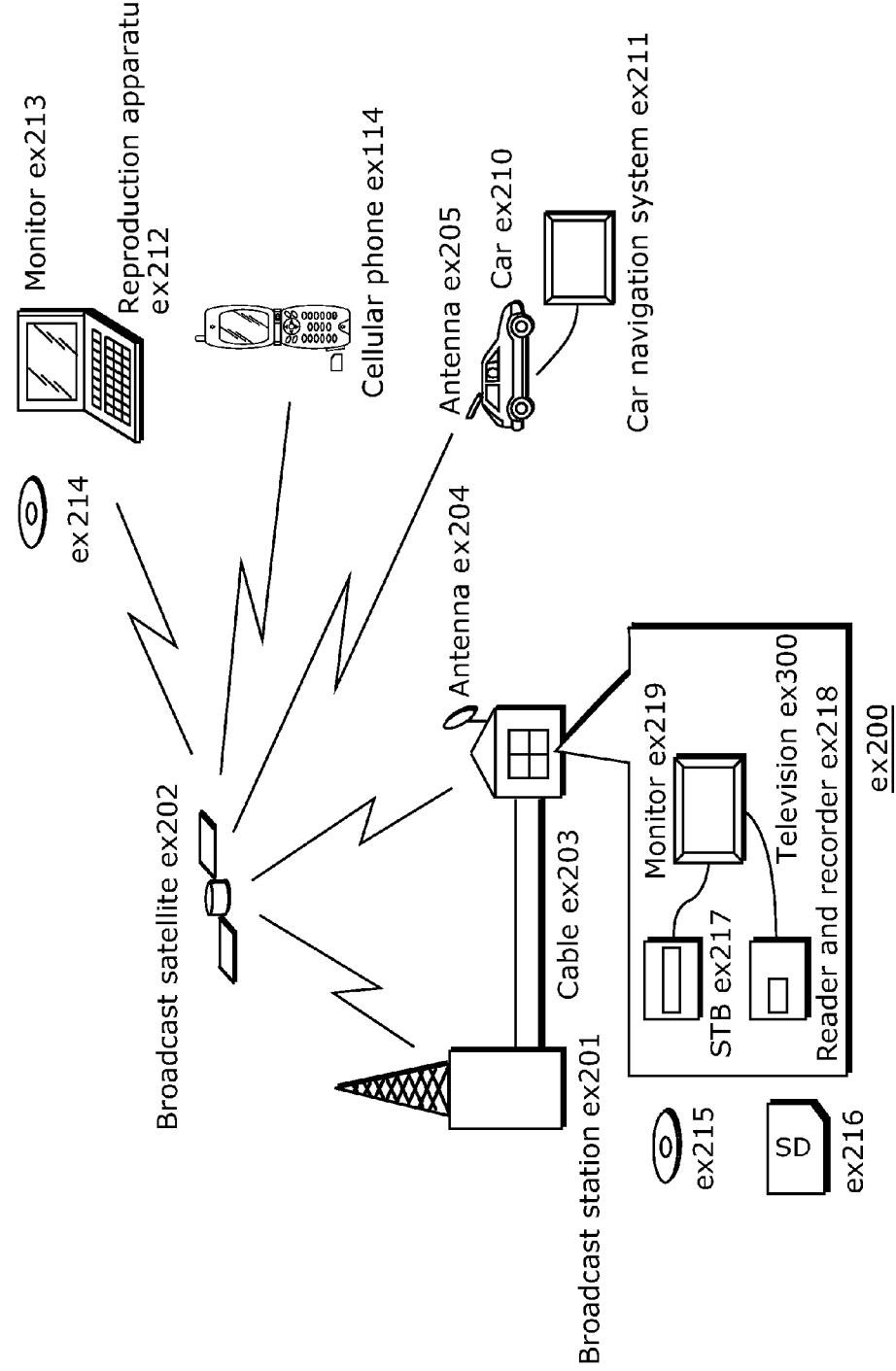
FIG. 30 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 30. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 31:
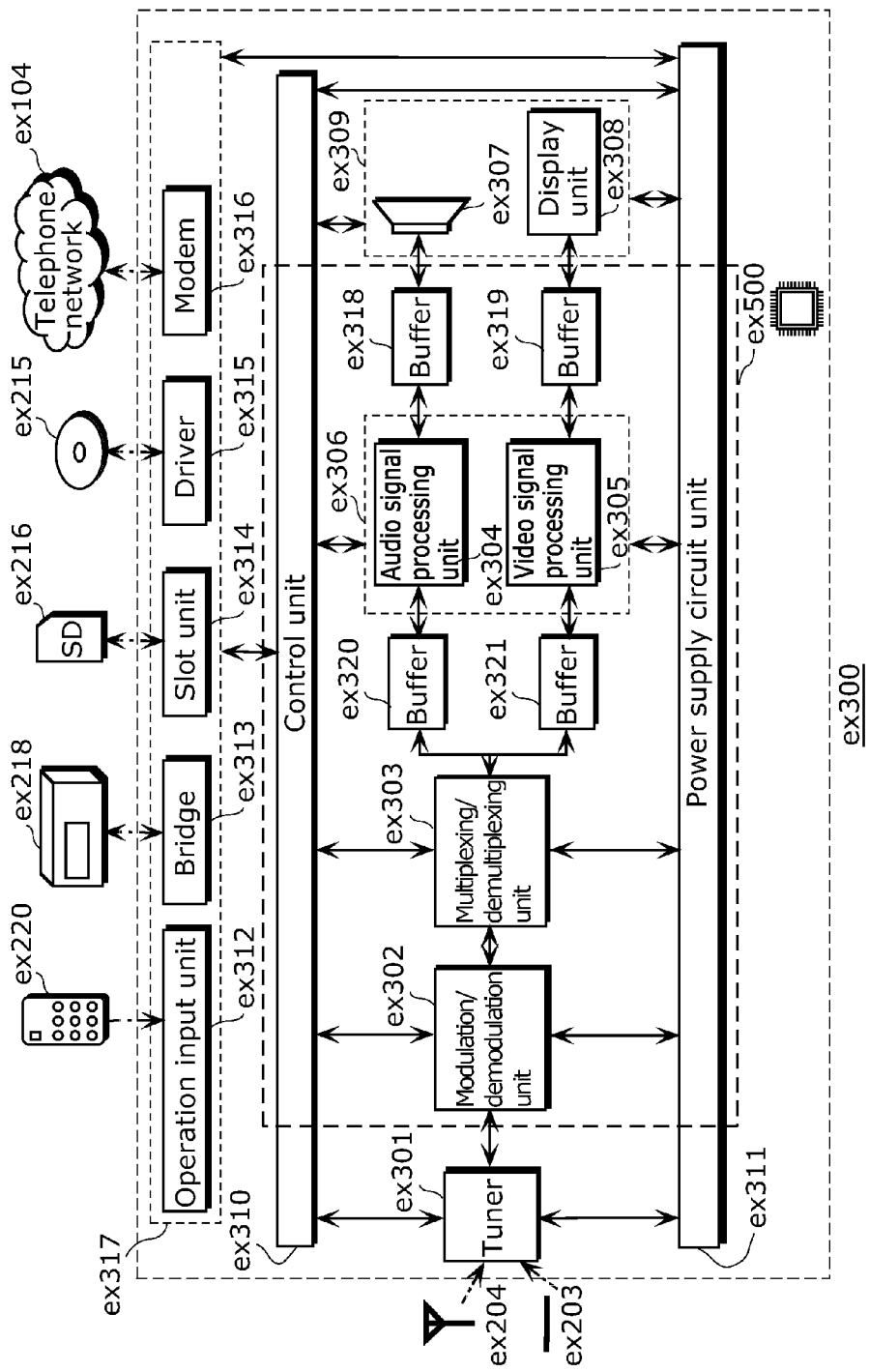
FIG. 31 shows a block diagram illustrating an example of a configuration of a television.

FIG. 31 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 32:
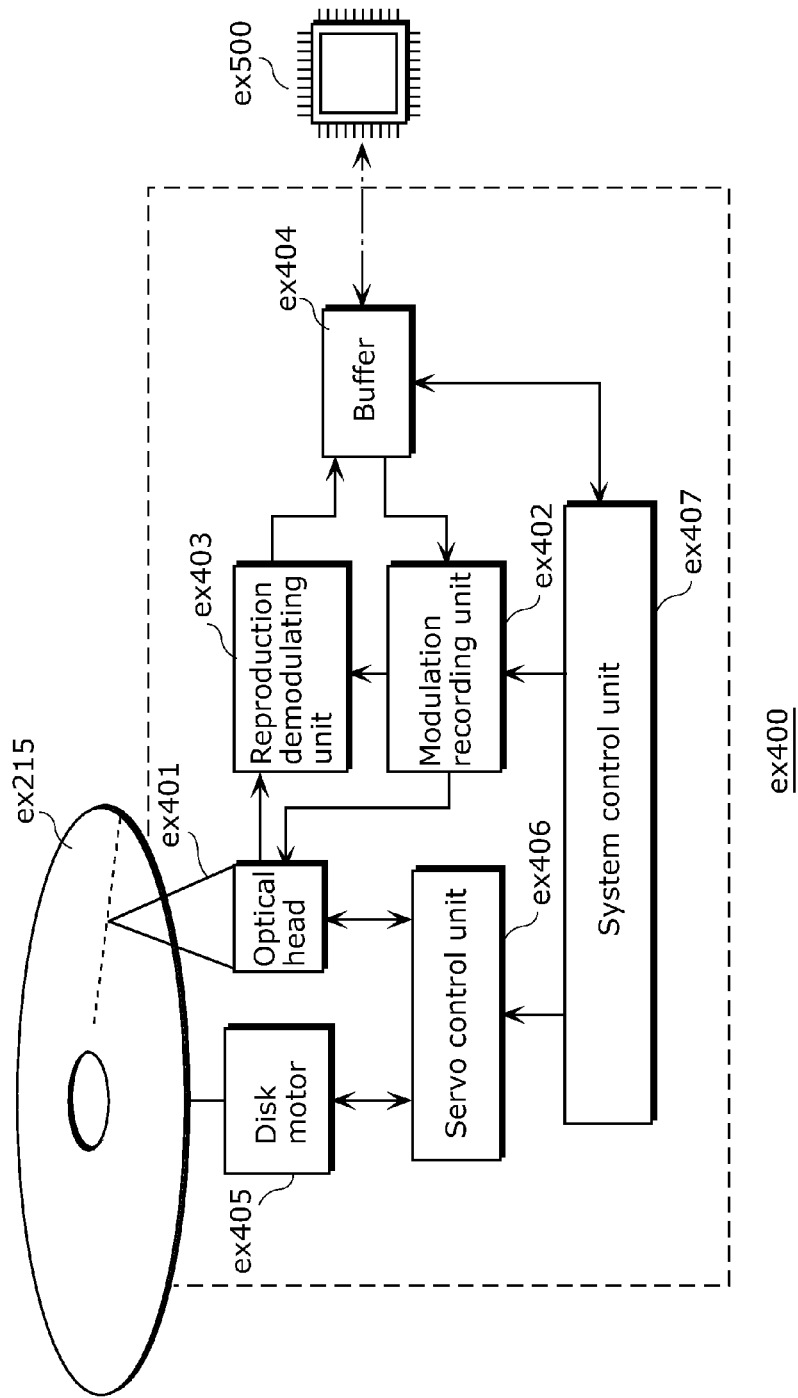
FIG. 32 shows a block diagram illustrating an example of a configuration of an information reproducing/recording unit that reads and writes information from and on a recording medium that is an optical disk.

As an example, FIG. 32 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 33:
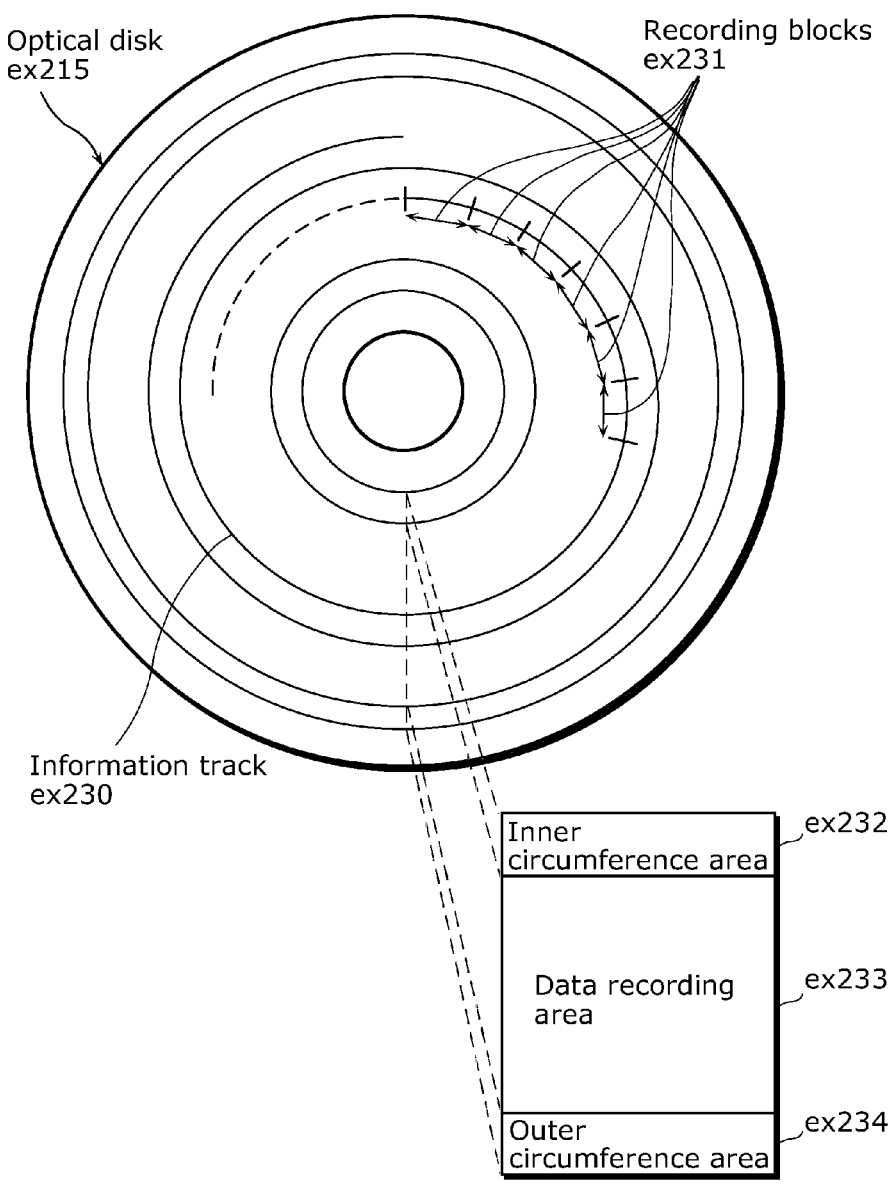
FIG. 33 shows an example of a configuration of a recording medium that is an optical disk.

FIG. 33 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 31. The same will be true for the configuration of the computer ex111, the cellular phone ex114, and others.

Figure 34A:
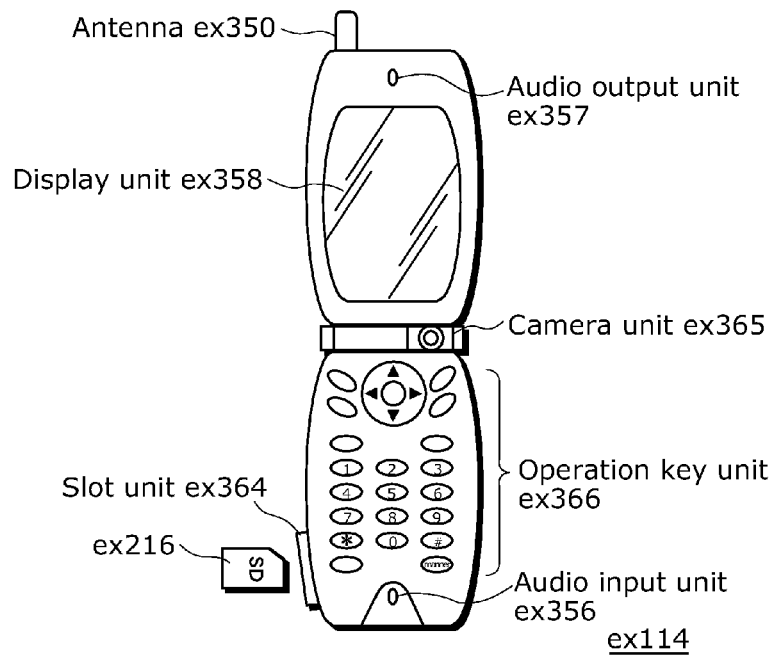
FIG. 34A shows an example of a cellular phone.

FIG. 34A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 34B:
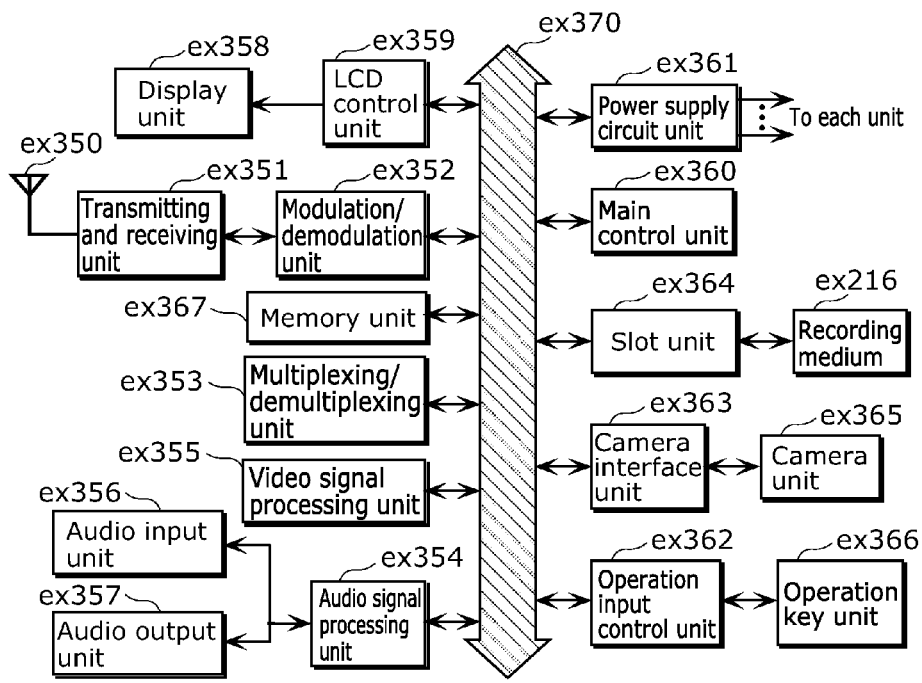
FIG. 34B is a block diagram showing an example of a configuration of a cellular phone.

Next, an example of a configuration of the cellular phone ex114 will be described with reference to FIG. 34B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 9

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 35 illustrates a structure of the multiplexed data. As illustrated in FIG. 35, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 36:
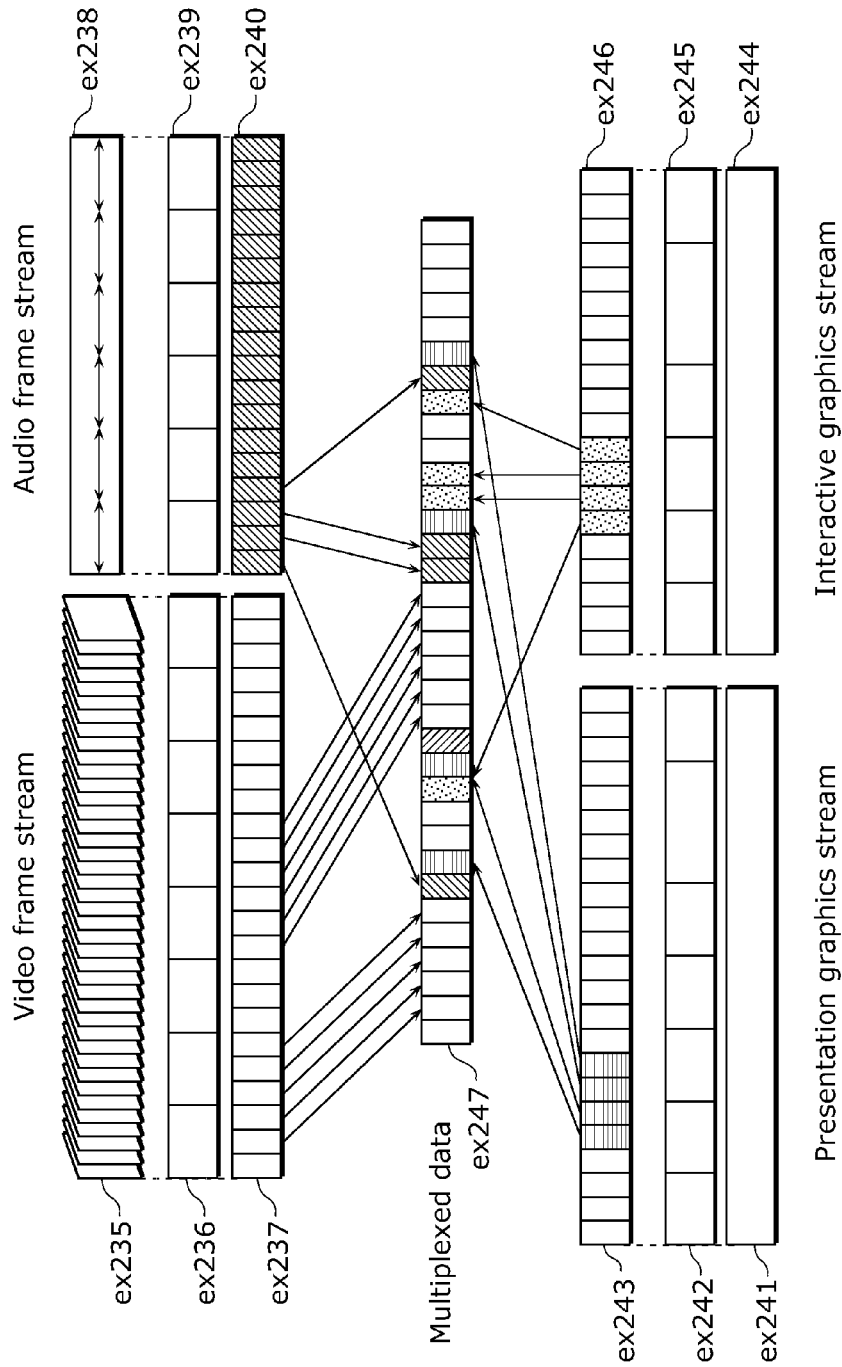
FIG. 36 schematically shows how each stream is multiplexed in multiplexed data.

FIG. 36 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 37:
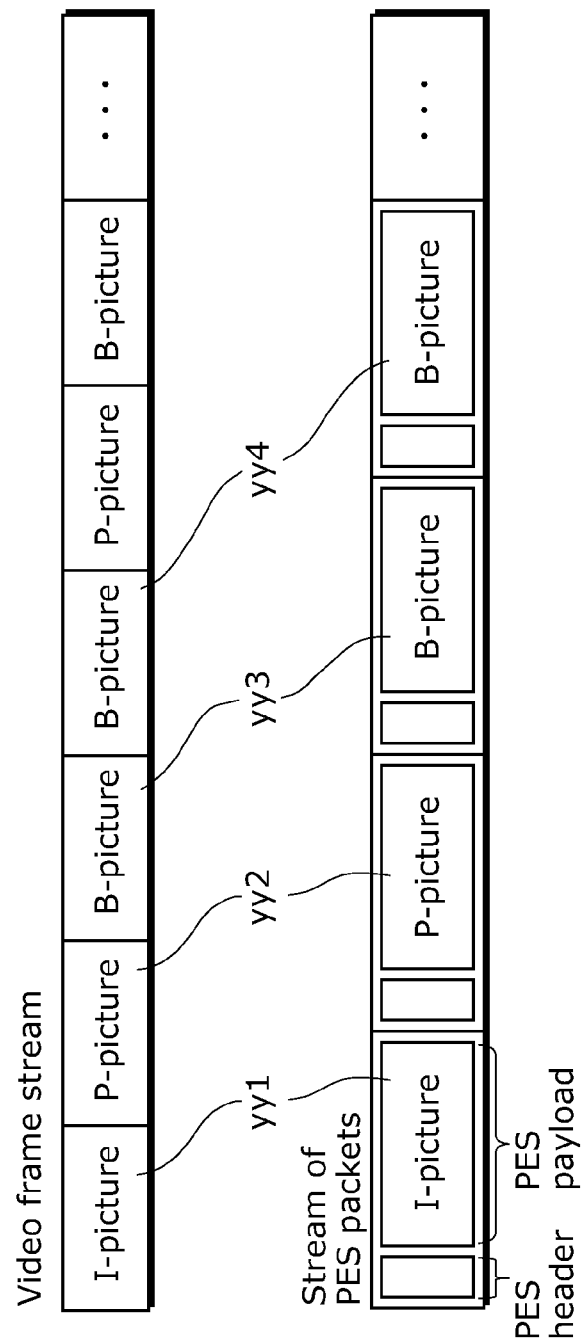
FIG. 37 shows how a video stream is stored in a stream of PES packets in more detail.

FIG. 37 illustrates how a video stream is stored in a stream of PES packets in more detail. The first bar in FIG. 37 shows a video frame stream in a video stream. The second bar shows the stream of PES packets. As indicated by arrows denoted as yy1, yy2, yy3, and yy4 in FIG. 37, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 38 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 38. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 39:
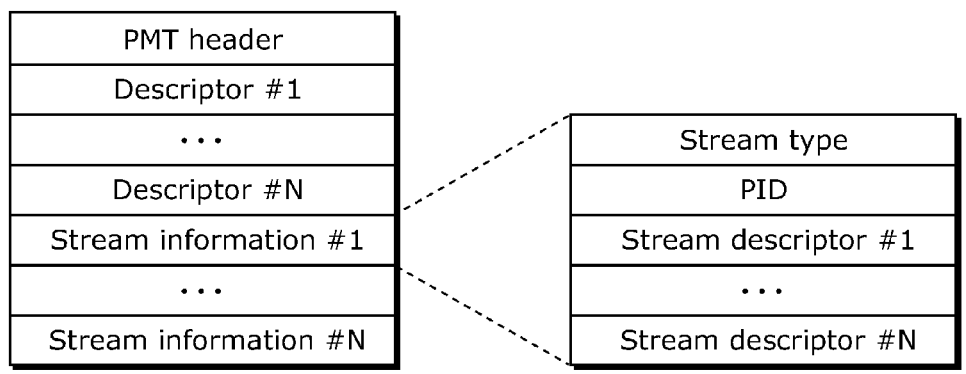
FIG. 39 shows a data structure of a PMT.

FIG. 39 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 40:
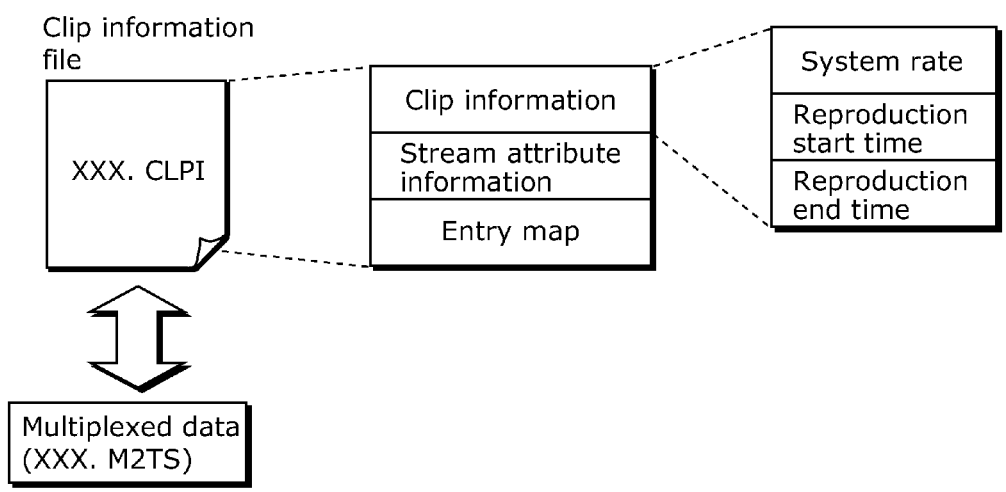
FIG. 40 shows an internal structure of multiplexed data information.

Each of the multiplexed data information files is management information of the multiplexed data as shown in FIG. 40. The multiplexed data information files are in one to one correspondence with the multiplexed data, and each of the files includes multiplexed data information, stream attribute information, and an entry map.

As illustrated in FIG. 40, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 41:
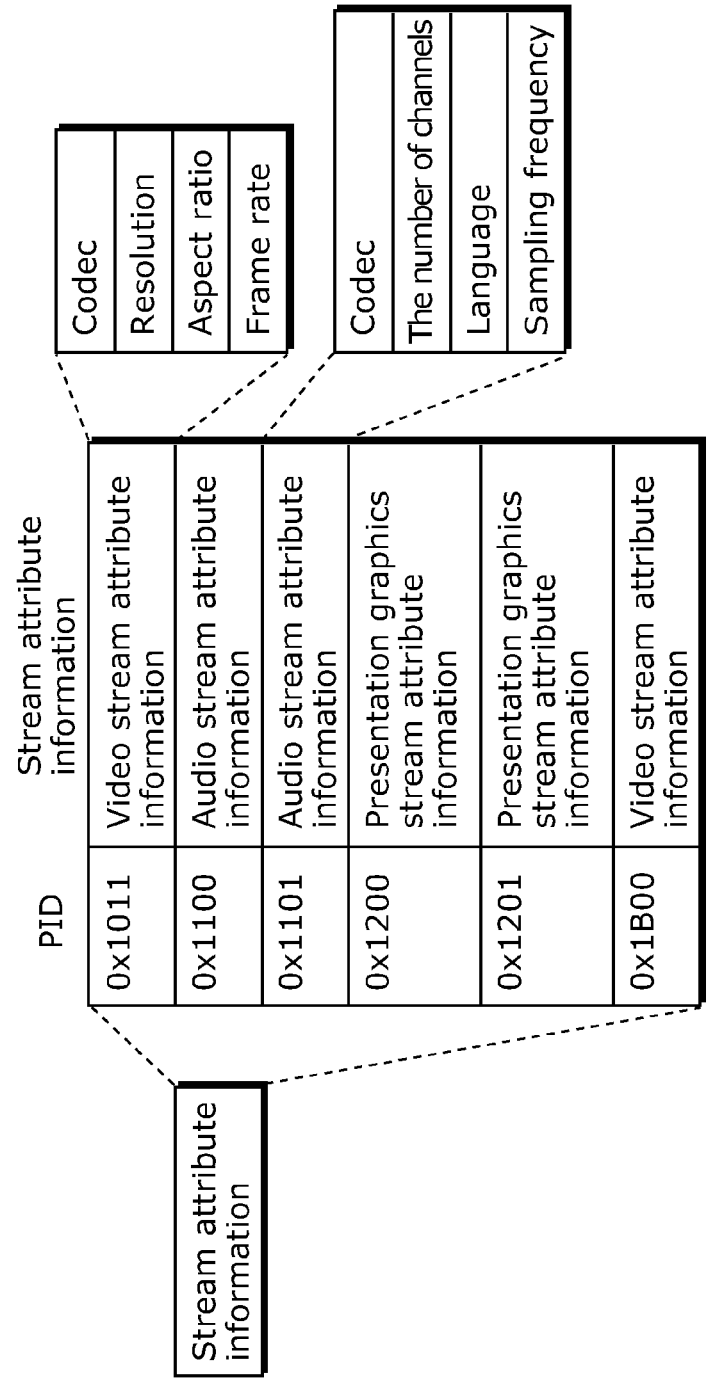
FIG. 41 shows an internal structure of stream attribute information.

As shown in FIG. 41, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 42:
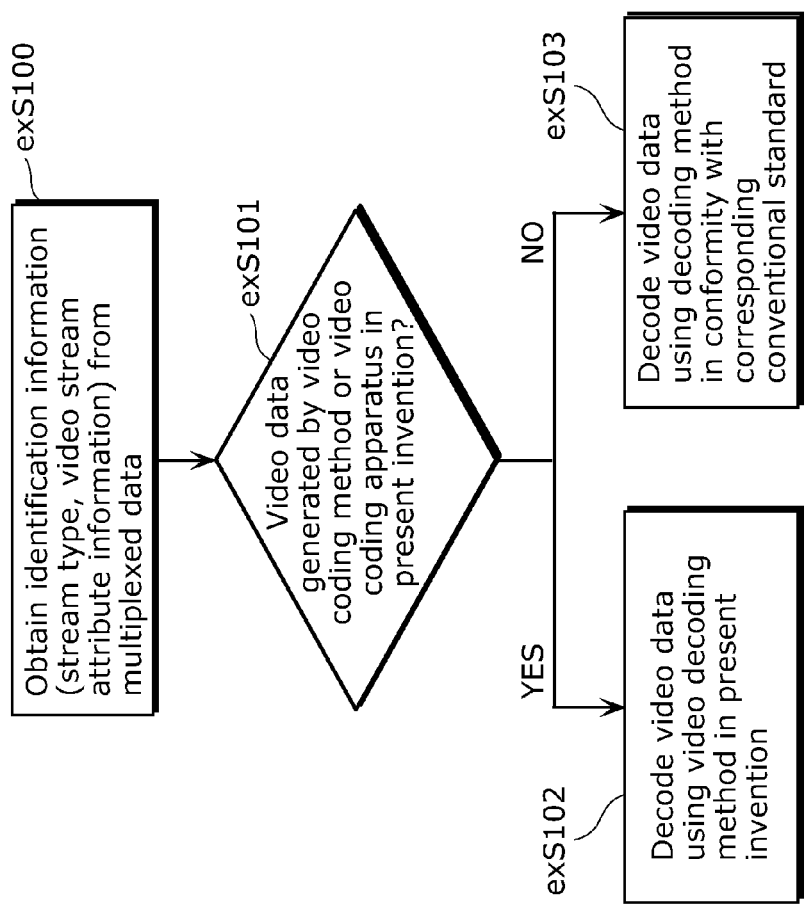
FIG. 42 shows steps for identifying video data.

Furthermore, FIG. 42 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 10

Figure 43:
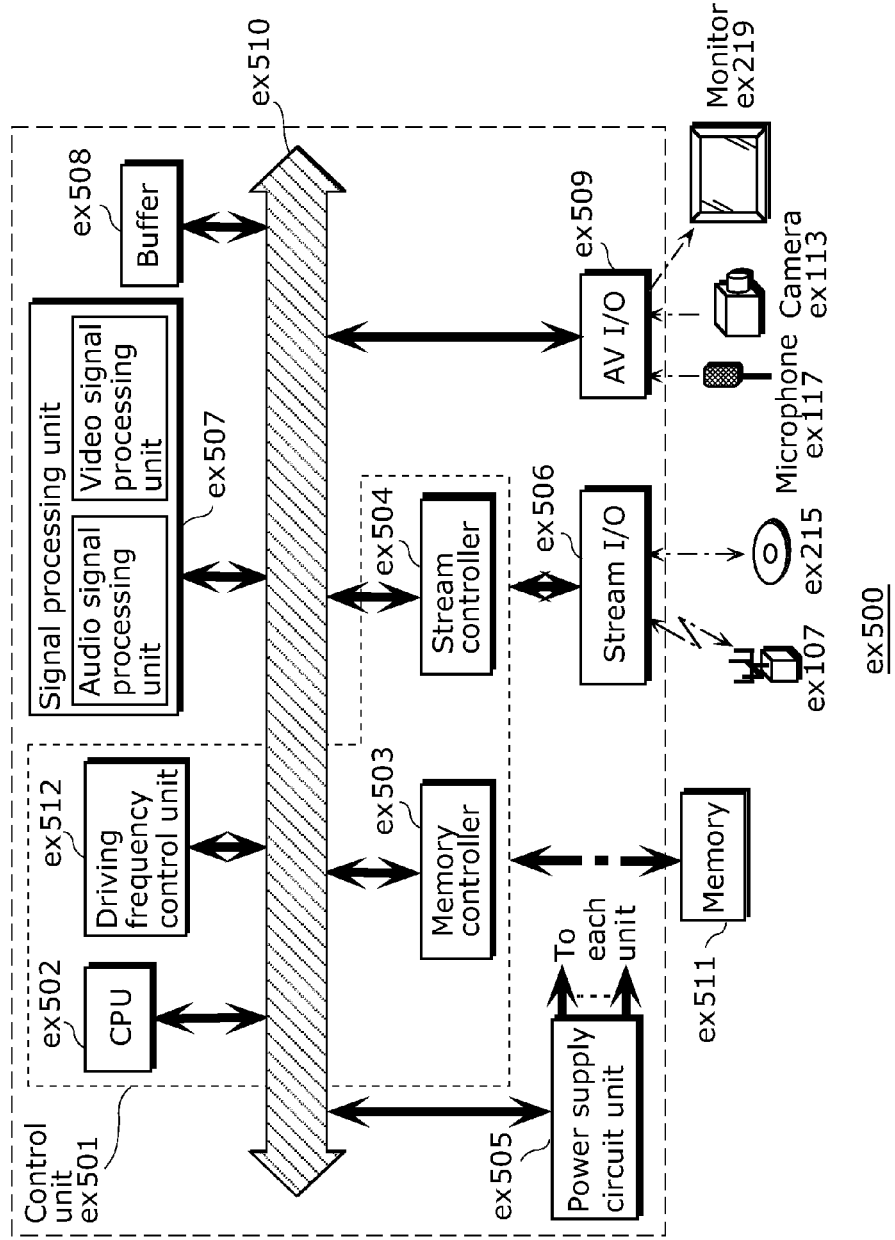
FIG. 43 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 43 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 11

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 44:
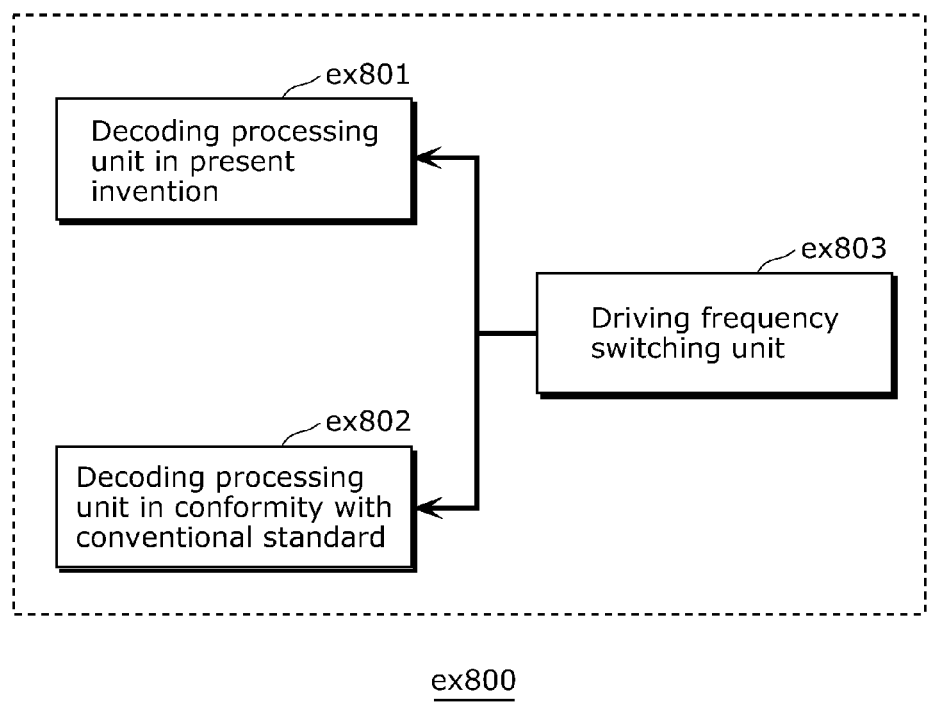
FIG. 44 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 44 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 43. Here, each of the decoding processing unit ex801 that executes the moving picture decoding method described in each of embodiments and the decoding processing unit ex802 that conforms to the conventional standard corresponds to the signal processing unit ex507 in FIG. 43. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 9 is probably used for identifying the video data. The identification information is not limited to the one described in Embodiment 9 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 46. The driving frequency can be selected by storing the look-up table in the buffer ex508 and in an internal memory of an LSI, and with reference to the look-up table by the CPU ex502.

Figure 45:
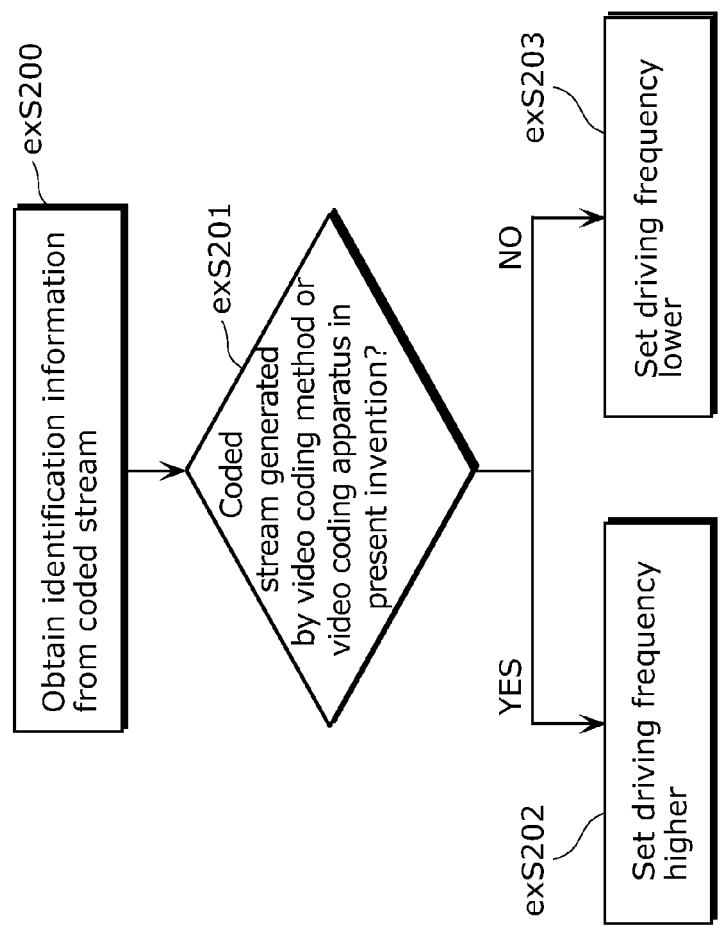
FIG. 45 shows steps for identifying video data and switching between driving frequencies.

FIG. 45 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 12

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 47A:
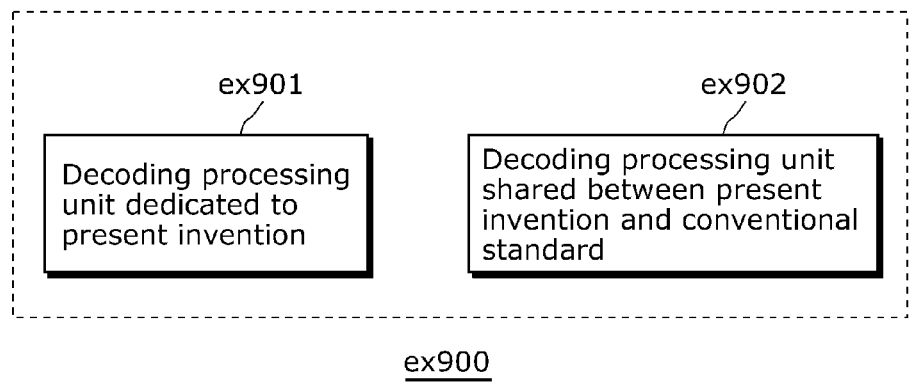
FIG. 47A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 47A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 47B:
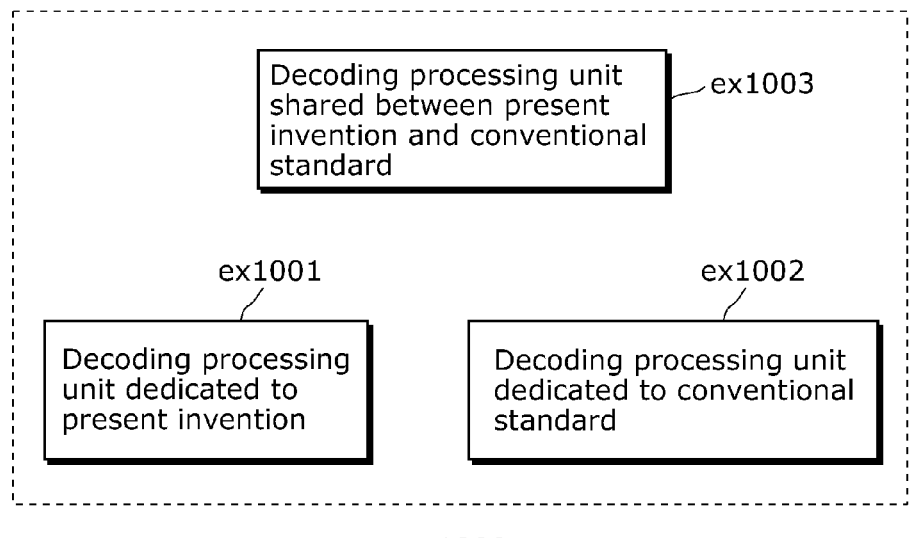
FIG. 47B is a diagram showing another example of a configuration for sharing a module of the signal processing unit.

Furthermore, ex1000 in FIG. 47B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

An image coding method and an image decoding method according to the present disclosure are applicable to various applications such as high-resolution information display apparatuses and/or high-resolution image capturing apparatuses such as television sets, digital video recorders, car navigation systems, mobile phones, digital cameras, digital video cameras.

The invention claimed is:

1. An image coding method of coding a chrominance signal, the image coding method comprising:
   generating an intra prediction chrominance signal of a current block according to an intra prediction mode;
   calculating a residual signal of the current block from the intra prediction chrominance signal of the current block and an input chrominance signal of the current block;
   performing transform and quantization on the residual signal of the current block to calculate quantized coefficients;
   performing inverse quantization and inverse transform on the quantized coefficients to calculate a coded residual signal of the current block;
   generating a temporarily coded chrominance signal of the current block, from the coded residual signal and the intra prediction chrominance signal of the current block;
   calculating a direct-current component of the input chrominance signal of the current block;
   calculating a direct-current component of the temporarily coded chrominance signal of the current block;

calculating an offset value from the direct-current component of the input chrominance signal of the current block and the direct-current component of the temporarily coded chrominance signal of the current block;

coding the quantized coefficients, the intra prediction mode, and the offset value; and adding the offset value to the temporarily coded chrominance signal of the current block to generate the coded chrominance signal of the current block.

2. The image coding method according to claim 1, wherein, in the calculating of a direct-current component of an input chrominance signal of the current block, the direct-current component of the input chrominance signal of the current block is one of an average value of pixel values of pixels in the input chrominance signal of the current block and a direct-current component obtained by performing frequency transform on the input chrominance signal of the current block.

3. The image coding method according to claim 1, wherein, in the calculating of a direct-current component of a temporarily coded chrominance signal of the current block, the direct-current component of the temporarily coded chrominance signal of the current block is one of an average value of pixel values of pixels in the temporarily coded chrominance signal of the current block and a direct-current component obtained by performing frequency transform on the temporarily coded chrominance signal of the current block.

4. An image coding method of coding a chrominance signal, the image coding method comprising:

generating an intra prediction chrominance signal of a current block according to an intra prediction mode;

calculating a residual signal of the current block from the intra prediction chrominance signal of the current block and an input chrominance signal of the current block;

performing transform and quantization on the residual signal of the current block to calculate quantized coefficients;

performing inverse quantization and inverse transform on the quantized coefficients to calculate a coded residual signal of the current block;

generating a temporarily coded chrominance signal of the current block, from the coded residual signal and the intra prediction chrominance signal of the current block;

calculating an offset value using a current block size and a quantization width on the residual signal of the current block;

coding the quantized coefficients, the intra prediction mode, and the offset value; and adding the offset value to the temporarily coded chrominance signal of the current block to generate the coded chrominance signal of the current block.

5. The image coding method according to claim 1, further comprising determining whether an offset process needs to be performed on the current block to be processed, based on the input chrominance signal of the current block.

6. The image coding method according to claim 4, further comprising determining whether an offset process needs to be performed on the current block to be processed, using the current block size and a quantization width.

7. The image coding method according to claim 5, wherein, when, based on the input chrominance signal, it is determined in the determining that the offset process does not need to be performed on the current block to be processed, the following processes are skipped: the calculating of the direct-current component of the input chrominance signal of the current block, the calculating of the direct-current component of the temporarily coded chrominance signal of the current block, the calculating of the offset value, and the coding of the offset value.

8. The image coding method according to claim 1, further comprising performing an offset process on a coded luminance signal of the current block.

9. An image decoding method of decoding a chrominance signal, the image decoding method comprising:

performing variable length decoding on a bitstream of a current block to obtain quantized coefficients, an intra prediction mode, and an offset value;

performing inverse quantization and inverse transform on the quantized coefficients to obtain a decoded residual signal of the current block;

generating an intra prediction chrominance signal of the current block according to the intra prediction mode of the chrominance signal of the current block;

generating a temporarily decoded chrominance signal of the current block, from the decoded residual signal of the current block and the intra prediction chrominance signal of the current block; and generating a decoded chrominance signal of the current block by adding the offset value to a direct-current component of the temporarily decoded chrominance signal of the current block.

10. The image decoding method according to claim 9, further comprising:

determining whether or not an offset process needs to be performed; and performing variable length decoding on a bitstream only when the offset process needs to be performed, to obtain information about the offset unit;

wherein, in the generating of a decoded chrominance signal of the current block, the offset value is added to the a direct-current component of the temporarily decoded chrominance signal of the current block only when the offset process needs to be performed.

11. The image decoding method according to claim 9, further comprising determining whether an offset process needs to be performed on a current block to be processed, using a current block size and a quantization width.

12. The image decoding method according to claim 9, further comprising performing an offset process on a decoded luminance signal of the current block.

* * * * *